(12) United States Patent
Lai et al.

(10) Patent No.: US 11,119,189 B2
(45) Date of Patent: Sep. 14, 2021

(54) CALIBRATION SYSTEM AND CALIBRATION BRACKET THEREOF

(71) Applicant: AUTEL INTELLIGENT TECHNOLOGY CORP., LTD., Guangdong (CN)

(72) Inventors: Biwang Lai, Guangdong (CN); Xiaolong Wang, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 17/109,683

(22) Filed: Dec. 2, 2020

(65) Prior Publication Data

US 2021/0088626 A1  Mar. 25, 2021

Related U.S. Application Data

(63) Continuation of application No. PCT/CN2020/073838, filed on Jan. 22, 2020.

(30) Foreign Application Priority Data

Feb. 1, 2019 (CN) .......................... 201910105255.7

(51) Int. Cl.
- *G01S 7/40* (2006.01)
- *G01B 11/14* (2006.01)
- *G01S 13/931* (2020.01)

(52) U.S. Cl.
CPC ............ *G01S 7/4004* (2013.01); *G01B 11/14* (2013.01); *G01S 13/931* (2013.01)

(58) Field of Classification Search
CPC ...... G01S 7/4004; G01S 13/931; G01B 11/14
See application file for complete search history.

(56) References Cited

U.S. PATENT DOCUMENTS

| | | | | |
|---|---|---|---|---|
| 2,127,734 A | * | 8/1938 | James Hill | ........... G01M 11/061 33/288 |
| 2,149,302 A | * | 3/1939 | MacMillan | .......... G01M 11/061 33/288 |

(Continued)

FOREIGN PATENT DOCUMENTS

| CN | 1764818 A | 4/2006 |
|---|---|---|
| CN | 201764219 U | 3/2011 |

(Continued)

OTHER PUBLICATIONS

The International Search Report dated Apr. 20, 2020; PCT/CN2020/073838.

(Continued)

*Primary Examiner* — Nimeshkumar D Patel
*Assistant Examiner* — Tania Courson

(57) ABSTRACT

The present invention relates to the field of vehicle correction, and provides a calibration system and a calibration bracket thereof. The calibration bracket includes: a base, a stand assembly and a beam assembly. The stand assembly is fixedly connected to the base. The beam assembly includes a first beam portion, a second beam portion and a connecting portion, the connecting portion being mounted to the stand assembly, one end of the connecting portion being hinged to the first beam portion, and the other end of the connecting portion being hinged to the second beam portion. The first beam portion and the second beam portion can respectively rotate toward each other relative to the connecting portion, so that the beam assembly can be folded. The first beam portion and the second beam portion can also respectively rotate away from each other relative to the connecting portion, so that the beam assembly can be unfolded. In the foregoing structure, the first beam portion and the second beam portion can respectively rotate toward each other relative to the connecting portion, so that the beam assembly (Continued)

is folded, thereby reducing a volume of the calibration bracket to facilitate shipment.

20 Claims, 16 Drawing Sheets

(56) References Cited

U.S. PATENT DOCUMENTS

| | | | | |
|---|---|---|---|---|
| 2,167,803 | A * | 8/1939 | Graham | G01M 11/061 356/121 |
| 2,291,114 | A * | 7/1942 | Squyer | G01M 11/061 356/121 |
| 2,979,983 | A * | 4/1961 | Carrigan | G01M 11/067 356/121 |
| 4,134,680 | A * | 1/1979 | Hunter | G01M 11/061 250/208.6 |
| 4,615,618 | A * | 10/1986 | Bailey | G01B 11/2755 33/203.17 |
| 5,809,658 | A * | 9/1998 | Jackson | G01B 11/2755 33/203.18 |
| 6,498,959 | B1 * | 12/2002 | January | G01B 11/00 33/227 |
| 6,526,665 | B2 * | 3/2003 | Jackson | G01B 5/255 33/203.18 |
| 7,121,011 | B2 * | 10/2006 | Murray | G01B 11/2755 33/288 |
| 7,536,936 | B2 * | 5/2009 | Gerdes | B23B 5/04 82/1.11 |
| 8,282,052 | B2 * | 10/2012 | Huang | F16M 11/045 248/125.1 |
| 9,170,101 | B2 * | 10/2015 | Stieff | G01S 7/4026 |
| 9,644,782 | B2 * | 5/2017 | Linson | F16M 11/046 |
| 10,180,209 | B2 * | 1/2019 | Bowman | F16M 11/24 |
| 10,323,936 | B2 * | 6/2019 | Leikert | G01B 11/2755 |
| 10,634,488 | B2 * | 4/2020 | Stieff | G01S 7/4972 |
| 10,767,807 | B2 * | 9/2020 | Kulesia, II | F16M 11/2021 |
| 10,794,996 | B2 * | 10/2020 | Qiu | G01S 7/4026 |
| 10,821,607 | B2 * | 11/2020 | Chen | B60S 5/00 |
| 2002/0189115 | A1 * | 12/2002 | Jackson | G01B 11/002 33/286 |
| 2004/0049930 | A1 * | 3/2004 | Murray | G01S 7/4972 33/288 |
| 2012/0086941 | A1 * | 4/2012 | Hayes | G01M 11/067 356/399 |
| 2013/0325252 | A1 * | 12/2013 | Schommer | G01S 7/52004 701/33.1 |
| 2016/0223822 | A1 | 8/2016 | Harrison et al. | |
| 2018/0052223 | A1 | 2/2018 | Stieff et al. | |
| 2020/0149935 | A1 * | 5/2020 | Qiu | F16M 11/2085 |
| 2020/0174097 | A1 * | 6/2020 | Wang | G01S 7/40 |
| 2020/0240775 | A1 * | 7/2020 | Qiu | B60W 30/12 |
| 2020/0271267 | A1 * | 8/2020 | Govekar | G01S 13/931 |
| 2020/0319298 | A1 * | 10/2020 | Wang | G01S 13/931 |
| 2020/0340793 | A1 * | 10/2020 | Wang | G01S 7/40 |
| 2020/0344466 | A1 * | 10/2020 | Huang | G06T 7/80 |
| 2020/0353613 | A1 * | 11/2020 | Wang | B25H 5/00 |
| 2020/0355792 | A1 * | 11/2020 | Tang | G01S 7/4008 |
| 2020/0400782 | A1 * | 12/2020 | Tang | G01S 7/40 |

FOREIGN PATENT DOCUMENTS

| | | |
|---|---|---|
| CN | 202177377 U | 3/2012 |
| CN | 102590796 A | 7/2012 |
| CN | 203390592 U | 1/2014 |
| CN | 203921022 U | 11/2014 |
| CN | 204479090 U | 7/2015 |
| CN | 204630740 U | 9/2015 |
| CN | 105197789 A | 12/2015 |
| CN | 106405526 A | 2/2017 |
| CN | 206132999 U | 4/2017 |
| CN | 206185537 U | 5/2017 |
| CN | 206804864 U | 12/2017 |
| CN | 107678004 A | 2/2018 |
| CN | 108345321 A | 7/2018 |
| CN | 108581982 A | 9/2018 |
| CN | 208270760 U | 12/2018 |
| CN | 209524919 U | 10/2019 |
| CN | 209524941 U | 10/2019 |
| CN | 209524942 U | 10/2019 |
| JP | 2007139056 A | 6/2007 |
| WO | 2018/067354 A1 | 4/2018 |

OTHER PUBLICATIONS

The International Search Report dated Apr. 30, 2020; PCT/CN2020/073875.

The first chinese office action dated Dec. 28, 2020; Appln. No. 201910214535.1.

The first chinese office action dated Jan. 4, 2021; Appln. No. 201910362935.7.

* cited by examiner

CALIBRATION SYSTEM AND CALIBRATION BRACKET THEREOF

This application is a continuation of International Patent Application No. PCT/CN2020/073838 filed on Jan. 22, 2020, which claims priority to Chinese Patent Application No. 201910105255.7 filed on Feb. 1, 2019, both of which are incorporated by reference herein in their entireties.

BACKGROUND

Technical Field

The present application relates to the technical field of vehicle maintenance and device calibration, and in particular, to a calibration system and a calibration bracket thereof.

Related Art

An advanced driver assistant system (ADAS for short) is an active security technology that is used to collect environmental data inside and outside a vehicle at the first time using various sensors mounted to the vehicle to perform technical processing such as identification, detection, and tracking of static and dynamic objects, so that a driver can detect a possible danger as quickly as possible, thereby attracting attention and improving safety. A sensor used in the ADAS mainly includes a camera, radar, a laser, and an ultrasonic wave, which may be used to detect light, heat, pressure, or other variables for monitoring a state of the vehicle, and is usually located on front and rear bumpers, on a side mirror, inside a steering column, or on a windscreen of the vehicle. During the use of the vehicle, vibration, collision, environmental temperature and humidity, and the like will change the physical mounting status of the sensor, and therefore irregular correction or calibration is required.

When the foregoing sensor is corrected or calibrated, calibration elements are usually mounted to the calibration bracket to correct or calibrate the sensor on the vehicle. However, most of the current calibration brackets are relatively large, occupy a relatively large area, are complicated to assemble, and are difficult to move.

SUMMARY

Embodiments of the present invention are intended to provide a calibration system and a calibration bracket thereof, which can solve the technical problem that a calibration element is difficult to move in the prior art.

In the embodiments of the present invention, the technical problem is resolved by using the following technical solutions.

A calibration bracket is provided, including:
a base;
a stand assembly fixedly connected to the base; and
a beam assembly including a first beam portion, a second beam portion and a connecting portion, the connecting portion being mounted to the stand assembly, one end of the connecting portion being pivotally connected to the first beam portion, and the other end of the connecting portion being pivotally connected to the second beam portion.

Optionally, the stand assembly includes a fixed vertical rod and a movable vertical rod,
one end of the fixed vertical rod being mounted to the base;
the movable vertical rod being arranged in the fixed vertical rod and being capable of moving only along a length direction of the fixed vertical rod relative to the fixed vertical rod; and p the beam assembly being mounted to the movable vertical rod.

Optionally, cross-sections of the fixed vertical rod and the movable vertical rod are non-circular.

Optionally, one of the fixed vertical rod and the movable vertical rod includes a guide rail, the other being guided by the guide rail to move only along the length direction of the fixed vertical rod.

Optionally, the beam assembly includes a mounting seat, the connecting portion being arranged in the mounting seat and mounted to the stand assembly through the mounting seat; and the mounting seat being provided with a fixing rod, the fixing rod including at least one section of screw rod, so that the fixing rod can be screwed to press the connecting portion on the mounting seat.

Optionally, one of the mounting seat and the connecting portion includes at least one positioning column, and the other includes at least one positioning hole, the at least one positioning column being inserted into the at least one positioning hole to position the connecting portion in the mounting seat.

Optionally, the fixing rod is at an angle to a horizontal direction, so that the connecting portion is pressed on a bottom surface and one side surface of the mounting seat, the angle being greater than 0 degree and less than 90 degrees.

Optionally, the angle is 45 degrees.

Optionally, the beam assembly includes an adjustment mechanism connected to the mounting base and configured to adjust a horizontal angle of the mounting base and the connecting portion.

Optionally, the adjustment mechanism includes a first elastic member, a rotating member and an adjusting rod, the rotating member being connected to the mounting seat, and the rotating member being capable of rotating around an adjustment rotation axis relative to the mounting seat, the adjustment rotation axis being arranged vertically;

one end of the first elastic member being fixed to the mounting seat, and the other end being fixed to the rotating member; and the adjusting rod being mounted to the mounting seat and being in screw-thread fit with the mounting seat;

the adjusting rod being rotated, so that the adjusting rod pushes the mounting seat to rotate around the adjustment rotation axis relative to the rotating member, and the horizontal angle of the mounting seat and the connecting portion can be adjusted; and the adjusting rod being rotated, so that the adjusting rod is away from the mounting seat, and the mounting seat can be pulled, by using the first elastic member, to rotate and reset around the adjustment rotation axis relative to the rotating member.

Optionally, the adjustment mechanism includes a supporting shaft and a bearing seat, the supporting shaft being fixedly mounted to the mounting base, and a central axis of the supporting shaft overlapping with the adjustment rotation axis;

the rotating member being sleeved on the bearing seat; and the supporting shaft being inserted into the bearing seat, and the supporting shaft and the mounting seat being capable of rotating together around the adjustment rotation axis relative to the rotating member and the bearing seat.

Optionally, the stand assembly includes a driving mechanism mounted to the fixed vertical rod and configured to drive the movable vertical rod to move along a length direction of the fixed vertical rod relative to the fixed vertical rod.

Optionally, the driving mechanism includes a gear reduction assembly.

Optionally, the stand assembly includes a driving mechanism mounted to the fixed vertical rod and configured to drive the movable vertical rod to move along a length direction of the fixed vertical rod relative to the fixed vertical rod, the driving mechanism including a rack, a housing, a worm, a worm gear and a second transmission gear, the rack being fixedly mounted to the movable vertical rod, being arranged along a length direction of the movable vertical rod, and forming the guide rail;

the housing being fixedly mounted to the fixed vertical rod;

the worm being engaged with the worm gear;

the worm gear being fixedly mounted to the second transmission gear, a rotation axis of the worm gear overlapping with a rotation axis of the second transmission gear, and the worm gear and the second transmission gear being capable of rotating around a third rotation axis; and the second transmission gear being fixedly mounted to the housing and being engaged with the rack;

the third rotation axis being perpendicular to the rack.

Optionally, the stand assembly includes a fastening mechanism and an elastomer, the fastening mechanism being mounted to the fixed vertical rod and configured to fix the movable vertical rod to the fixed vertical rod, and the elastomer being connected between the bottom of the fixed vertical rod and the movable vertical rod and being in a compressed state.

Optionally, the beam assembly includes at least one supporting rod configured to support a target to prevent falling.

Optionally, the supporting rod is pivotally connected to one of the first beam portion, the second beam portion and the connecting portion.

Optionally, at least one of the first beam portion, the second beam portion and the connecting portion includes a supporting rod guide rail, the supporting rod being supported by the supporting rod guide rail and being capable of moving along the supporting rod guide rail.

Optionally, the supporting rod includes a supporting rod body and a supporting member, the supporting rod body being provided with a slot, at least one of the first beam portion, the second beam portion and the connecting portion being provided with a fixture block, or at least one of the first beam portion, the second beam portion and the connecting portion being provided with a slot, and the supporting rod body being provided with a fixture block, the fixture block being engaged into the slot to engage the supporting rod with the at least one of the first beam portion, the second beam portion and the connecting portion.

Optionally, the beam assembly includes a first fastener and a second fastener, one end of one of the first beam portion and the connecting portion being hinged to one first fastener, one end of the other being provided with one second fastener, and the first fastener and the second fastener being fastened to each other to fasten the first beam portion to the connecting portion.

Optionally, the beam assembly includes at least one joint mechanism connected between the first beam portion and the connecting portion or between the second beam portion and the connecting portion.

Optionally, the joint mechanism includes a first fixing member and a second fixing member, the first fixing member including a fastening member, a rotating shaft and a second elastic member, the rotating shaft being fixedly connected to an inner wall of the first fixing member, the fastening member being mounted to the rotating shaft, being capable of rotating around the rotating shaft, and including a first end and a second end, the first end and the second end being respectively located at two ends of the rotating shaft, and the second elastic member being connected to the inner wall of the first fixing member and the first end of the fastening member; and the second fixing member including a locking protrusion, the locking protrusion being mated with the second end of the fastening member and being engaged with the fastening member under the action of the second elastic member.

Optionally, the joint mechanism further includes a screwing mechanism, the screwing mechanism passing through the first fixing member and being screwed to abut against the first end of the fastening member, so that the first end can be fastened to the locking protrusion.

Optionally, the joint mechanism further includes a button, and the second end of the fastening member includes a bump, the button passing through the second fixing member and being capable of abutting against the bump in a pressed state, so that the locking protrusion can be separated from the fastening member.

The embodiments of the present invention further adopt the following technical solution to resolve the technical problem.

A calibration bracket is provided, including:

a base;

a fixed vertical rod, one end of the fixed vertical rod being mounted to the base;

a movable vertical rod arranged in the fixed vertical rod and capable of moving only along a length direction of the fixed vertical rod relative to the fixed vertical rod; and a foldable beam assembly mounted to a top surface of the movable vertical rod.

Optionally, the beam assembly includes a beam, an adjustment mechanism and a mounting seat, the beam being disposed in the mounting seat, the mounting seat being disposed on the adjustment mechanism, and the adjustment mechanism being configured to adjust a horizontal angle of the beam.

The embodiments of the present invention further adopt the following technical solution to resolve the technical problem.

A calibration bracket is provided, including:

a base;

a stand assembly fixedly connected to the base; and a foldable beam assembly mounted to the stand assembly and including a beam, the beam including at least two parts, the at least two parts being connected through a joint mechanism, so that the at least two parts can be pivotally connected.

Optionally, the joint mechanism includes a first fixing member and a second fixing member, the first fixing member including a fastening member, a rotating shaft and a second elastic member, the rotating shaft being fixedly connected to an inner wall of the first fixing member, the fastening member being mounted to the rotating shaft, being capable of rotating around the rotating shaft, and including a first end and a second end, the first end and the second end being respectively located at two ends of the rotating shaft, and the second elastic member being connected to the inner wall of the first fixing member and the first end of the fastening member; and the second fixing member including a locking protrusion, the locking protrusion being mated with the second end of the fastening member and being engaged with the fastening member under the action of the second elastic member.

Optionally, the joint mechanism further includes a screwing mechanism, the screwing mechanism passing through the first fixing member and being screwed to abut against the first end of the fastening member, so that the first end can be fastened to the locking protrusion.

The embodiments of the present invention further adopt the following technical solution to resolve the technical problem.

A calibration bracket is provided, including:

a base;

a stand assembly fixedly connected to the base;

a foldable beam; and a mounting seat, the beam being disposed in the mounting seat, the mounting seat being provided with a fixing rod, the fixing rod being configured to press the beam on the mounting seat and being at an angle to a horizontal direction, the angle being greater than 0 degree and less than 90 degrees.

Optionally, the angle is 45 degrees.

Optionally, the fixing rod includes at least one section of screw rod, so that the fixing rod can be screwed to press the beam on the mounting seat.

The embodiments of the present invention further adopt the following technical solution to resolve the technical problem.

A calibration system includes a calibration element and the foregoing calibration bracket, the calibration element being mounted to the calibration bracket.

Compared with the prior art, in the calibration bracket of the present embodiment, the first beam portion and the second beam portion can respectively rotate toward each other relative to the connecting portion, so that the beam assembly is folded, thereby reducing a volume of the calibration bracket to facilitate shipment.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To facilitate the understanding of the present invention, the present invention is further described below in further detail with reference to the accompanying drawings and specific embodiments. It is to be noted that, when an element is described to be "fixed on" another element, it may be directly fixed on the other element, or there may be one or more intermediate elements between them. When an element is described to be "connected to" another element, it may be directly connected to the other element, or there may be one or more intermediate elements between them. In the description of this specification, orientation or position relationships indicated by the terms such as "up", "down", "inside", "outside", "vertical", and "horizontal" are based on orientation or position relationships shown in the accompanying drawings, and are used only for ease and brevity of illustration and description of the present invention, rather than indicating or implying that the mentioned apparatus or component needs to have a particular orientation or needs to be constructed and operated in a particular orientation. Therefore, such terms should not be construed as limiting of the present invention. In addition, terms "first" and "second" are only used to describe the objective and cannot be understood as indicating or implying relative importance.

Unless otherwise defined, meanings of all technical and scientific terms used in the present invention are the same as that usually understood by a person skilled in the art to which the present disclosure belongs. Terms used in the specification of the present invention are merely intended to describe objectives of the specific embodiments, but are not intended to limit the present invention. A term "and/or" used in the present invention includes any or all combinations of one or more related listed items.

In addition, the technical features involved in the different embodiments of the present invention described below may be combined with each other so long as they do not constitute a conflict with each other.

Figure 1:
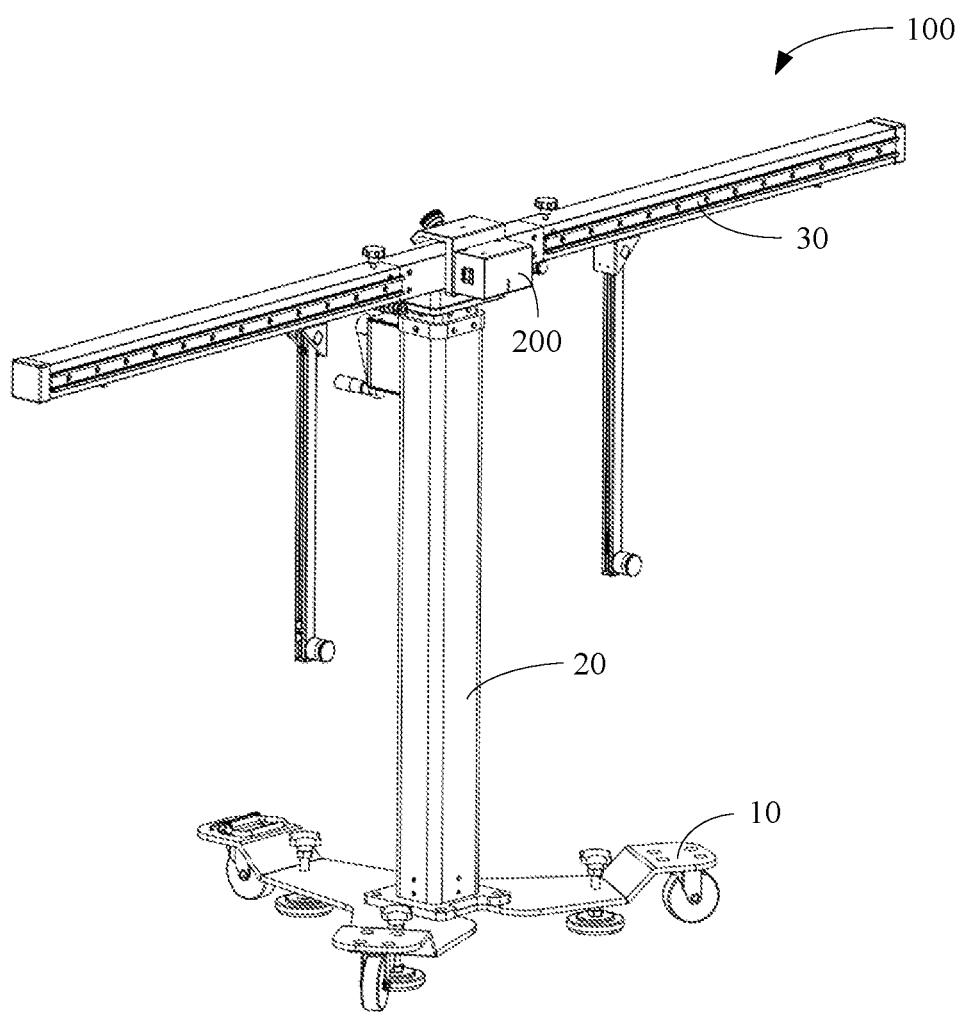
FIG. 1 is a three-dimensional view of a calibration bracket according to an embodiment of the present invention, where a multi-line laser is mounted to the calibration bracket.
Figure 2:
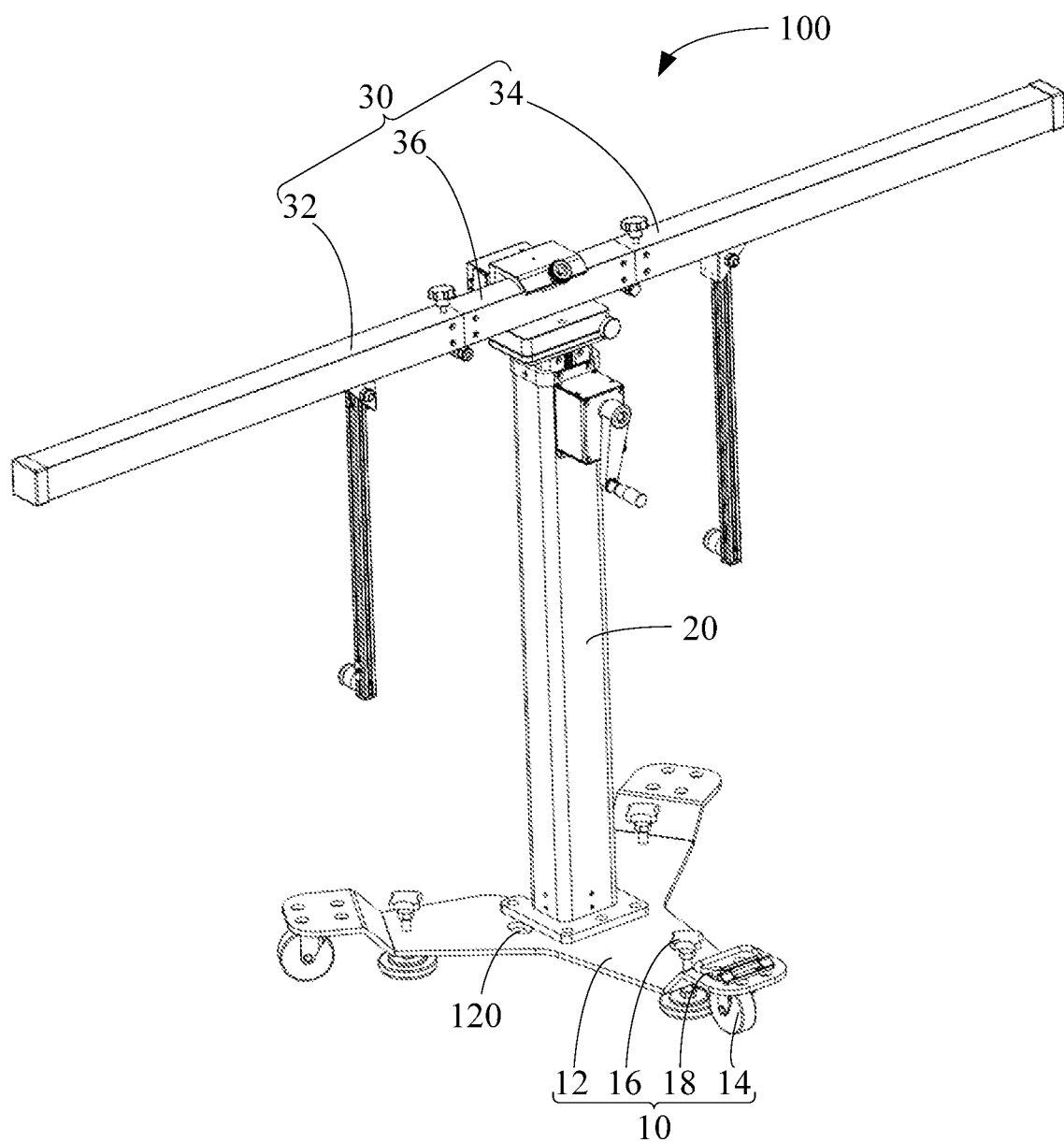
FIG. 2 is a three-dimensional view of the calibration bracket shown in FIG. 1 from another perspective.
Figure 3:
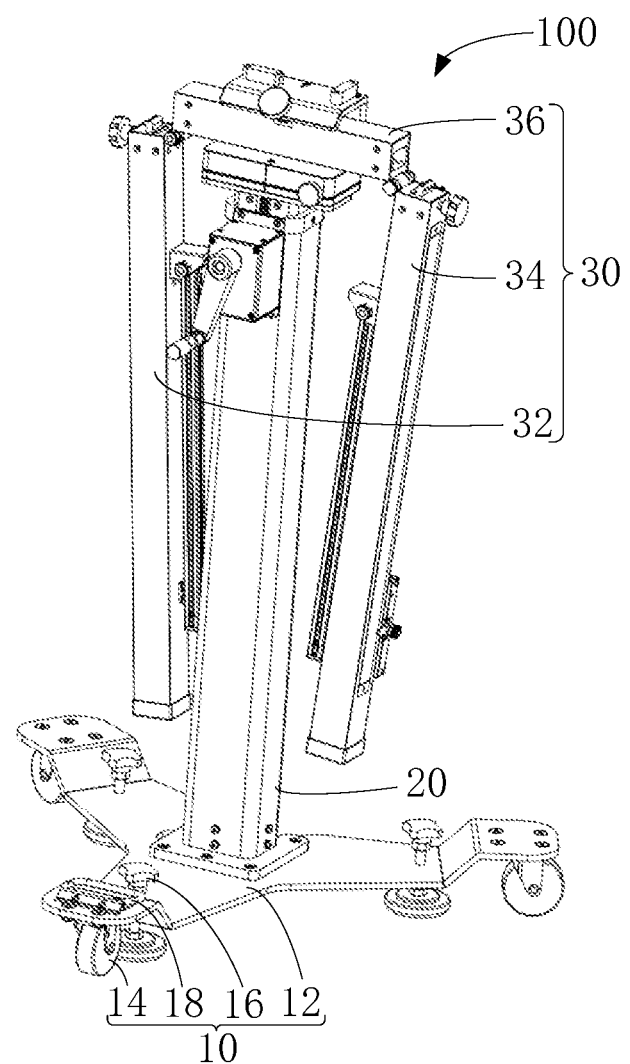
FIG. 3 is a three-dimensional view of the calibration bracket shown in FIG. 1, where a beam assembly of the calibration bracket is in a folded state.

Referring to FIG. 1, FIG. 2, and FIG. 3, a calibration bracket 100 provided in one embodiment of the present invention includes a base 10, a stand assembly 20 and a beam assembly 30. The stand assembly 20 is fixedly connected to the base 10. The beam assembly 30 includes a first beam portion 32, a second beam portion 34 and a connecting portion 36. The connecting portion 36 is mounted to the stand assembly 20. One end of the connecting portion 36 is pivotally connected to the first beam portion 32, and the other end of the connecting portion 36 is pivotally connected to the second beam portion 34. The first beam portion 32 and the second beam portion 34 can respectively rotate toward each other relative to the connecting portion 36, so that the beam assembly 30 can be folded. The first beam portion 32 and the second beam portion 34 can also respectively rotate away from each other relative to the connecting portion 36, so that the beam assembly 30 can be unfolded.

The "mounting" includes fixed mounting such as welding mounting as well as detachable mounting.

The beam assembly 30 may be used to mount a calibration element, for example, a multi-line laser 200, a calibration target, a radar reflection or absorption device, and the like, to calibrate the vehicle-mounted driver assistant system.

In the calibration bracket 100 of the present embodiment, the first beam portion 32 and the second beam portion 34 can pivotally rotate relative to the connecting portion 36, respectively, so that the beam assembly 30 can be folded, thereby reducing a volume of the calibration bracket 100 to facilitate shipment.

The first beam portion 32, the second beam portion 34 and the connecting portion 36 constitute a beam.

Optionally, the beam assembly is mounted to a top surface of a movable vertical rod. In this way, compared with the traditional calibration bracket, a center of gravity of the beam assembly is closer to a center of gravity of a vertical rod, which can improve the stability of the calibration bracket, so that a base with a smaller area can be used.

Optionally, the first beam portion 32 and the second beam portion 34 can rotate toward each other relative to the connecting portion 36, for example, which can be folded together downward, upward, forward, and backward. Optionally, when the first beam portion 32 and the second beam portion 34 are folded downward, a length of the connecting portion 36 can be relatively short, and the first beam portion 32 and the second beam portion 34 are in a drooping state. In this way, the beam assembly 30 does not need to be removed from the stand assembly 20, and space occupied by the calibration bracket 100 will be significantly reduced, which can be carried conveniently in vehicles. When the first beam portion 32 and the second beam portion 34 are folded upward, forward and backward, a device for rotating the beam may be disposed, so that the first beam portion 32 and the second beam portion 34 are finally folded downward, or may be in a drooping state. Alternatively, the length of the connecting portion 36 can be made relatively long, so that the first beam portion 32 and the second beam portion 34 can be placed close to the connecting portion 36 after being folded, and can be fixed onto the connecting portion 36 by using a releasable fixing device. In the latter case, in order to further reduce the space occupied by the calibration bracket 100, the beam assembly 30 may be removed from the stand assembly 20, carried to the place as needed, and then mounted onto the stand assembly 20.

Those skilled in the art may understand that the manner in which the beam assembly 30 is folded is not limited to the foregoing manner. For example, the beam may be folded into two ends, and there is no connecting portion 36 at this time. The beam can also be folded into four or more sections. However, three sections are exemplary, because this makes the middle section of the beam no fracture, so that only one fastening component can be used at the middle section to fix the beam onto the vertical rod stably.

The base 10 includes a base body 12, a roller 14, a height adjustment member 16 and a pull ring 18.

The base body 12 has a triangular claw shape and includes three claws extending in three different directions. The base body 12 may be made of a metal material.

The roller 14 is mounted to a bottom surface of the base body 12, and there may be three rollers 14. Each of the rollers 14 is mounted to an end of a corresponding one of the claws to facilitate movement of the base body 12. In the present embodiment, the roller 14 is an omni-directional moving roller, so that the base body 12 can move toward any direction.

The height adjustment member 16 is mounted to the base body 12 for adjusting a height of the base body 12. In the present embodiment, the height adjustment member 16 is an adjustment knob, and there are three height adjustment members. There is at least one section of screw rod under the knob, and the screw rod is mated with threads of a through hole at the base to implement height adjustment. Each of the height adjustment members 16 is mounted to a corresponding one of the claws and is close to a corresponding one of the rollers 14, and the three height adjustment members 16 are distributed in a regular triangle.

The pull ring 18 can be mounted to an upper surface of one of the claws to facilitate pulling of the calibration bracket 100.

It may be understood that, in some other embodiments, a shape of the base body 12 may vary according to an actual demand, and is not limited to a triangle claw shape. For example, the base body 12 may be a rectangle or a circle. The number of rollers 14 and height adjustment members 16 can be increased or decreased according to actual needs. For example, the triangular-claw-shaped base body 12 may be provided with two height adjustment members and mated with a foot with a fixed height, to adjust the angle of the base body 12.

Figure 4:
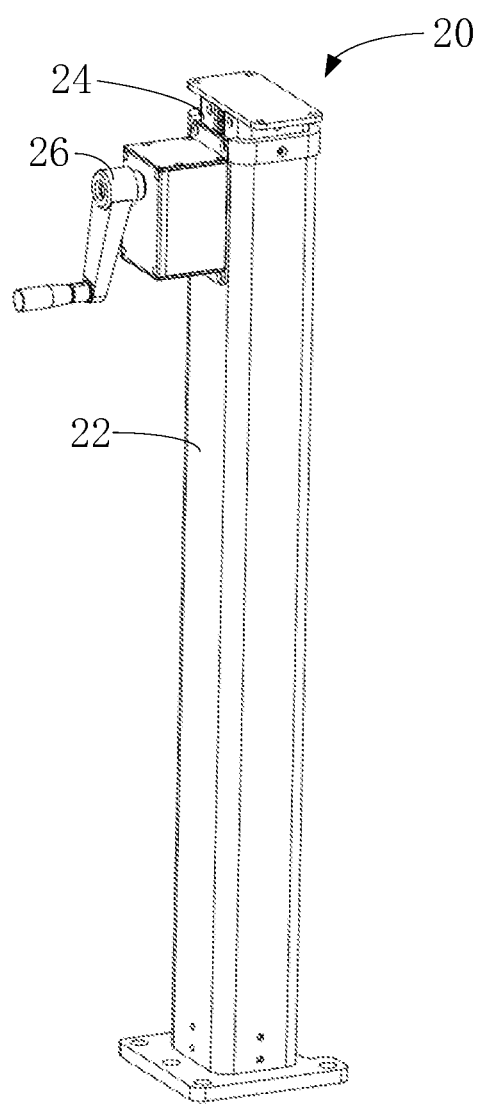
FIG. 4 is a three-dimensional view of a stand assembly of the calibration bracket shown in FIG. 1.
Figure 5:
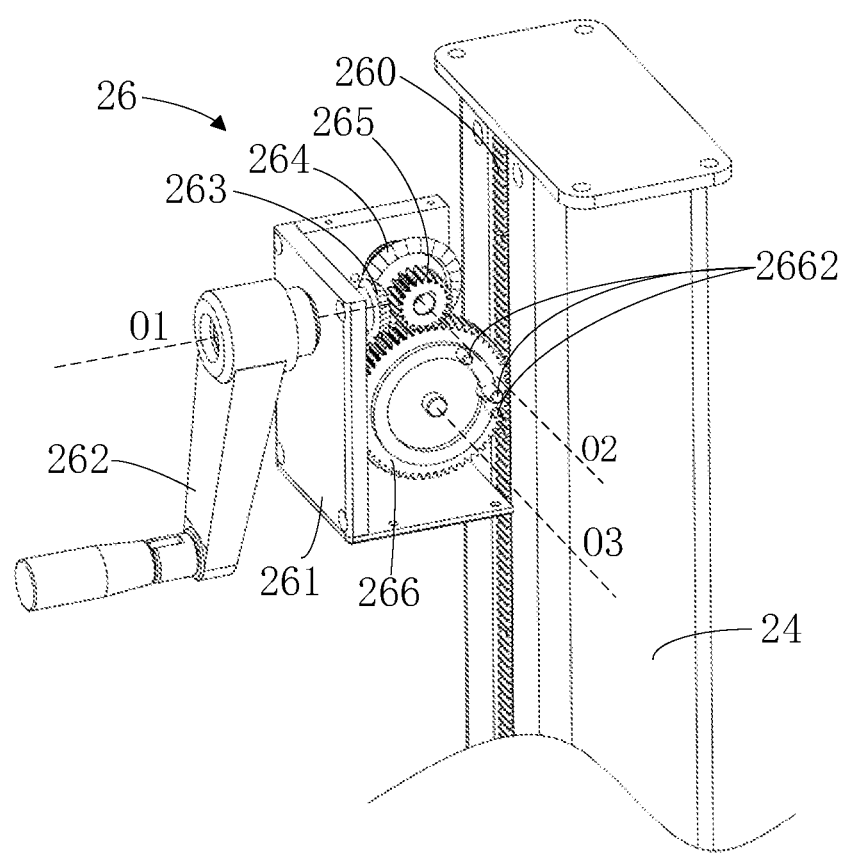
FIG. 5 is a three-dimensional view of the stand assembly shown in FIG. 4, where some elements are omitted.

Referring to FIG. 4 and FIG. 5 together, the stand assembly 20 may include a fixed vertical rod 22, a movable vertical rod 24 and a driving mechanism 26. The movable vertical rod 24 is sleeved in the fixed vertical rod 22, and can move along a length direction of the fixed vertical rod 22 relative to the fixed vertical rod 22. The driving mechanism 26 is mounted to the fixed vertical rod 22 and configured to drive the movable vertical rod 24 to move along the length direction of the fixed vertical rod 22 relative to the fixed vertical rod 22. By using the connection manner in which the movable vertical rod 24 and the fixed vertical rod 22 are sleeved, the height of the stand assembly 20 can be reduced to nearly half of the original height. The cross bar assembly 30 is folded, so that the stand assembly 20 can be very suitable for being placed in the trunk of the vehicle such as an automobile for carrying.

It may be understood that the fixed vertical rod can also be used as an inner rod and the movable vertical rod as an outer rod as required. The driving mechanism 26 is mounted to the fixed vertical rod 22 and configured to drive the movable vertical rod 24 to move along a length direction of the fixed vertical rod 22 relative to the fixed vertical rod 22.

Optionally, the fixed vertical rod 22 and the movable vertical rod 24 are respectively square tubes. The movable vertical rod 24 is tightly sleeved in the fixed vertical rod 22, so that the movable vertical rod 24 can move along the length direction of the fixed vertical rod 22 relative to the fixed vertical rod 22, and the movable vertical rod 24 can be prevented from moving toward other directions relative to the fixed vertical rod 22. This configuration is very important for the calibration bracket 100 to be foldable. Because in the calibration process, it is usually necessary to use the fixed relative position relationship between components of the calibration bracket 100. For example, it is possible to fix a laser on an outer surface of the fixed vertical rod 22. The laser is used to position the center axis of the vehicle, thereby determining the relative position between the target carried on the beam assembly 30 and the vehicle. Therefore, if the relative position of each component changes slightly, the calibration accuracy will be affected, or an additional fine-tuning mechanism will need to be added to compensate. If the relative position between the components changes greatly, it may cause the additional fine-tuning mechanism to fail. Therefore, in the folded mode, the relative movement between the movable vertical rod 24 and the fixed vertical rod 22 other than along the length direction, such as relative rotation, needs to be eliminated. A simple method is to make the movable vertical rod 24 and the fixed vertical rod 22 as square tubes, which can ensure that only relative movement along the length direction occurs between the two.

It may be understood that, in some other embodiments, the fixed vertical rod 22 and the movable vertical rod 24 may also be tubes of other shapes, for example, tubes with mutually matched polygonal cross-sections, so that the movable vertical rod 24 can move along the length direction of the fixed vertical rod 22 relative to the fixed vertical rod 22, and the movable vertical rod 24 can be prevented from moving toward other directions relative to the fixed vertical rod 22. The "mutually matched" herein does not necessarily require that the cross-sections of the fixed vertical rod 22 and the movable vertical rod 24 need to be the same. For example, the cross-section of the fixed vertical rod 22 arranged outside may be hexagonal, and the cross-section of the movable vertical rod 24 arranged inside may be a quadrilateral connected with the hexagon. As a result, the movable vertical rod 24 can only move along the length direction of the fixed vertical rod 22 relative to the fixed vertical rod 22. The cross-sections of the fixed vertical rod 22 and the movable vertical rod 24 can also be elliptical cylindrical tubes that are mated with each other, and the elliptical cross-section can also restrict the relative rotation between the two to a certain extent.

The fixed vertical rod 22 and the movable vertical rod 24 may also be cylindrical tubes with a circular cross-section. In this case, the fixed vertical rod 22 can be prevented, by using a guide mechanism, from rotating relative to the movable vertical rod 24, which is used to guide the movable vertical rod 24 to move stably relative to the fixed vertical rod 22, or to add, on other components of the calibration bracket 100, a mechanism for detecting and adjusting the movement of the fixed vertical rod 22 relative to the movable vertical rod 24 in other directions other than the length direction. A simple guide mechanism is a guide rail and a sliding block device matched with the guide rail. The guide rail can be provided on one of the fixed vertical rod 22 and the movable vertical rod 24 on a contact surface of the fixed vertical rod and the movable vertical rod, and a slider device such as a bump, a plastic rubber strip, a roller, a ball, a gears, and the like on the other. In this case, the slider device will be restricted to move on the guide rail, which can also ensure that only the relative movement along the length direction occurs between the two vertical rods. The guide rail may be a groove, a linear protrusion, a rack, and the like additionally disposed on the tube wall of the vertical rod, or may be a groove formed by the tube wall itself of the vertical rod, a linear protrusion, a groove formed between two linear protrusions, and the like. That is, the vertical rod uses a special-shaped tube wall, and the tube wall itself has the groove, the linear protrusion, and the like, which can be used as a part of the guide rail. Similarly, the slider device may be an additional component that is additionally disposed on the tube wall of the vertical rod, or may be a protruding structure formed by the tube wall itself of the vertical rod, without the need to dispose additional components on the tube wall of the vertical rod. In addition, a mechanism such as a rack that achieves transmission through meshing also has a guiding effect, which is also classified into the category of guide rails in this specification. The gear and rack transmission mechanism described in the following embodiments can also achieve the guiding effect. Optionally, the rack may be disposed in the groove guide rail.

It may be understood that the positions at which the guide rail and the slider device are disposed can be interchanged, the guide rail may be disposed on the movable vertical rod, the slider device may be disposed on the fixed vertical rod, and the positions for disposing the two can also be exchanged.

It may be understood that the guide mechanism is not limited to the fixed vertical rod 22 and the movable vertical rod 24 with a circular cross-section. The fixed vertical rod 22 and the movable vertical rod 24 of other cross-sectional shapes can also use a guide mechanism to enhance the guiding effect and obtain more stable or less frictional relative movement. For non-circular cross-sectional shapes, the guide rail may not be used, and only a linear motion device is used to obtain more stable or less frictional relative movement. In this case, the non-circular external vertical rod itself plays a guiding role.

The driving mechanism 26 includes a rack 260, a housing 261, a handle 262 and a gear reduction assembly. The gear reduction assembly includes a first helical gear 263, a second helical gear 264, a first transmission gear 265 and a second transmission gear 266.

The rack 260 is fixedly mounted to the movable vertical rod 24 and is disposed along a length direction of the movable vertical rod 24. When the base 10 is placed on a horizontal plane, the fixed vertical rod 22, the movable vertical rod 24 and the rack 260 are all vertically disposed.

The housing 261 is fixedly mounted to the fixed vertical rod 22.

The handle 262 is mounted to the housing 261 and can rotate around a first rotation axis O1.

The gear reduction assembly can make the position of the movable vertical rod move more accurately and labor-saving, which facilitates accurate determining of a height of a calibration target. In the gear reduction assembly, the first helical gear 263 is located in the housing 261 and is fixedly mounted to the handle 262. A rotation axis of the first helical gear 263 overlaps with a rotation axis of the handle 262, and the first helical gear 263 and the handle 262 can rotate together about the first rotation axis O1.

The second helical gear 264 is mounted to an inner wall of the housing 261 and can rotate around a second rotation axis O2. The first helical gear 263 is engaged with the second helical gear 264, and a diameter of the first helical gear 263 is less than a diameter of the second helical gear 264.

The first transmission gear 265 is fixedly mounted to the second helical gear 264, the rotation axis of the first transmission gear 265 overlaps with the rotation axis of the second helical gear 264, and the first transmission gear 265 and the second helical gear 264 can rotate around the second rotation axis O2 together.

The second transmission gear 266 is mounted to the inner wall of the housing 261 and can rotate around a third rotation axis O3. The second transmission gear 266 is engaged with the first transmission gear 265 and the rack 260, respectively. The second transmission gear 266 is provided with a convex pillar 2662 for matching a ratchet wheel (not shown), so that the second transmission gear 266 is stopped at a preset position. The first transmission gear 265 and the second transmission gear 266 are both spur gears, and a diameter of the first transmission gear 265 is less than a diameter of the second transmission gear 266.

The first rotation axis O1 is perpendicular to the second rotation axis O2 and the third rotation axis O3, and the first rotation axis O1 is perpendicular to the rack 260. The second rotation axis O2 and the third rotation axis O3 are arranged in parallel, and the second rotation axis O2 and the third rotation axis O3 are perpendicular to the rack 260.

When the handle 262 rotates around the first rotation axis O1, the first helical gear 263 is driven to rotate around the first rotation axis O1, the second helical gear 264 and the first transmission gear 265 rotate around the second rotation axis O2, and the second transmission gear 266 rotates around the third rotation axis O3. When the second transmission gear 266 rotates around the third rotation axis O3, the rack 260 is driven to rise or fall along the length direction of the movable vertical rod 24, so that the movable vertical rod 24 can rise or fall relative to the fixed vertical rod 22.

In the present embodiment, the first helical gear 263 is engaged with the second helical gear 264, the first transmission gear 265 and the second helical gear 264 can rotate together about the second rotation axis O2, and the second transmission gear 266 is engaged with the first transmission gear 265 and the rack 260, respectively, so that the movable vertical rod 24 can be driven to move stably relative to the fixed vertical rod 22. In addition, the diameter of the first helical gear 263 is less than the diameter of the second helical gear 264, and the diameter of the first transmission gear 265 is less than the diameter of the second transmission gear 266, so that the movable vertical rod 24 can be driven, through a relatively small force, to move relative to the fixed vertical rod 22.

It may be understood that in some other embodiments, the first helical gear 263 and the second helical gear 264 can be omitted. The first transmission gear 265 is fixedly mounted to the handle 262, and the handle 262 can rotate around the second rotation axis O2, thereby driving the first transmission gear 265 to rotate around the second rotation axis O2.

It may be understood that in some other embodiments, the first helical gear 263, the second helical gear 264 and the first transmission gear 265 can be omitted. The second transmission gear 266 is fixedly mounted to the handle 262, and the handle 262 can rotate around the third rotation axis O3, thereby driving the second transmission gear 266 to rotate around the third rotation axis O3.

Figure 6:
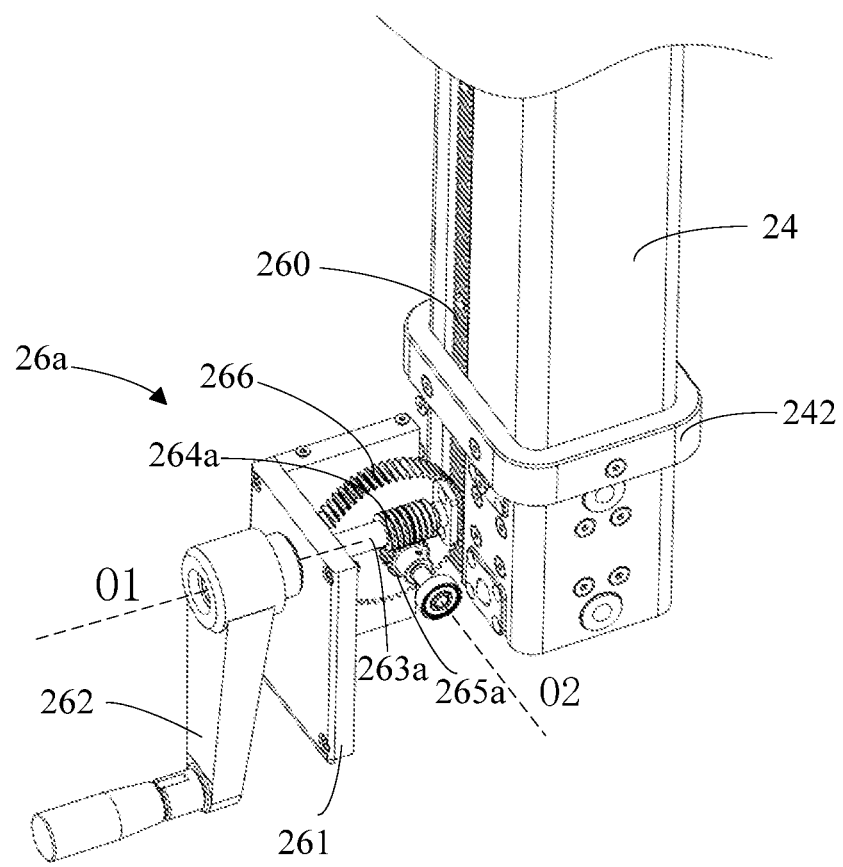
FIG. 6 is a three-dimensional view of a stand assembly according to some embodiments, where some elements are omitted.

Referring to FIG. 6, in some embodiments, the first helical gear 263, the second helical gear 264 and the first transmission gear 265 can be replaced with a worm mechanism, and the worm mechanism includes a worm 263a and a worm gear 265a.

One end of the worm 263a is fixedly mounted to the handle 262, the rotation axis of the worm 263a overlaps with the rotation axis of the handle 262, and the worm 263a and the handle 262 can rotate together about the first rotation axis O1.

The worm 263a is cylindrical, and an outer surface of the worm has a tooth portion 264a engaged with the worm gear 265a.

The worm gear 265a is fixedly mounted to the second transmission gear 266, a rotation axis of the worm gear 265a overlaps with a rotation axis of the second transmission gear 266, and the worm gear 265a and the second transmission gear 266 can rotate together around the second rotation axis O2. A diameter of the worm gear 265a is less than the diameter of the second transmission gear 266, so that the movable vertical rod 24 can be driven, through a relatively small force, to move relative to the fixed vertical rod 22. The first rotation axis O1 is perpendicular to the second rotation axis O2, and the second rotation axis O2 is perpendicular to the rack 260.

When the movable vertical rod 24 is moved to a desired position relative to the fixed vertical rod 22, the movable vertical rod 24 can be fixed at the desired position via the self-locking function of the worm mechanism.

It may be understood that, in some other embodiments, the handle 262 may be replaced with a motor.

It may be understood that, in some other embodiments, in addition to the gear box, the driving mechanism 26 may be other driving mechanisms, such as a screw drive, a timing belt, and the like, as long as the movable vertical rod 24 can be driven to move relative to the fixed vertical rod 22.

In some embodiments, the movable vertical rod 24 is provided with a limiting member 242, the limiting member 242 is located in the fixed vertical rod 22. The inner wall of the fixed vertical rod 22 is provided with a flange, and the flange is close to the top of the fixed vertical rod 22. When the movable vertical rod 24 moves relative to the fixed vertical rod 22 until the limiting member 242 abuts against the flange, the movable vertical rod 24 stops moving, which can prevent the movable vertical rod 24 from being separated from the fixed vertical rod 22. In the present embodiment, the limiting member 242 is a lantern ring, which is sleeved on an outer wall of the movable vertical rod 24.

Figure 7:
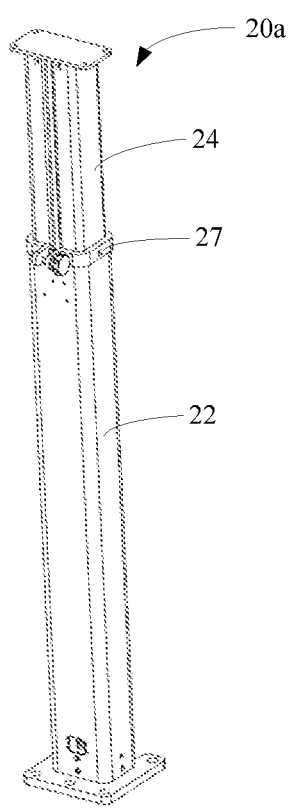
FIG. 7 is a three-dimensional view of a stand assembly according to some other embodiments.
Figure 8:
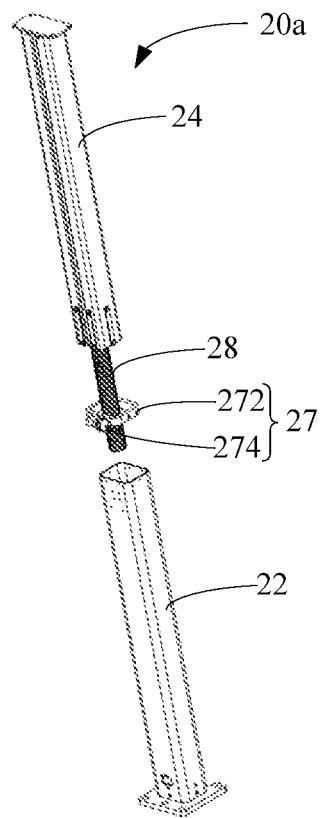
FIG. 8 is an exploded view of a stand assembly shown in FIG. 7.

Referring to FIG. 7 and FIG. 8, in some embodiments, the driving mechanism 26 is omitted, and the stand assembly 20 further includes a fastening mechanism 27 and an elastomer 28.

The fastening mechanism 27 may be mounted to one end of the fixed vertical rod 22 and configured to fix the movable vertical rod 24 to the fixed vertical rod 22. The fastening mechanism 27 includes a fastening ring 272 and a bolt 274. The fastening ring 272 is sleeved on the fixed vertical rod 22 and can be formed by bending a metal strip. The bolt 274 is mounted to two ends of the fastening ring 272.

The elastomer 28 is located in the fixed vertical rod 22 and the movable vertical rod 24, and the elastomer 28 is compressed between the bottom of the fixed vertical rod 22 and the movable vertical rod 24. According to requirements, the elastomer 28 can be connected to the movable vertical rod 24 at a position of the bottom, top or middle of the movable vertical rod 24. When the movable vertical rod moves to the bottom closest to the fixed vertical rod, the elastomer is in a compressed state. In the present embodiment, the elastomer 28 is a compression spring. It may be understood that, in some other embodiments, the elastomer 28 may be other elastic elements such as an elastic piece, a pneumatic rod, a hydraulic rod, and the like.

When the movable vertical rod 24 needs to be raised relative to the fixed vertical rod 22, the bolt 274 is rotated, so that the fastening ring 272 loosens the fixed vertical rod 22, and exerts upward force on the movable vertical rod 24. Therefore, the movable vertical rod 24 can rise along the length direction of the fixed vertical rod 22, and the elastic force of the elastomer 28 can be used to reduce the external force applied to the movable vertical rod 24, for example, the external force applied by the operator. When the required position is reached, the bolt 274 is rotated to fasten the fixed vertical rod 22, so that the movable vertical rod 24 is fixed at the required position. When the movable vertical rod 24 needs to be lowered relative to the fixed vertical rod 22, the bolt 274 is rotated, so that the fastening ring 272 loosens the fixed vertical rod 22. Under the gravity of the movable vertical rod 24 and the beam assembly 30, the movable vertical rod 24 can fall along the length direction of the fixed vertical rod 22, and the elastic force of the elastomer 28 can be used to reduce the falling speed of the movable vertical rod 24 to prevent the movable vertical rod 24 from damage caused by colliding with the fixed vertical rod 24 due to falling too fast.

It may be understood that, in some other embodiments, the fastening mechanism 27 may also have other structures, as long as the movable vertical rod 24 can be fixed at a desired position. For example, the fastening mechanism 27 may be a screw, which passes through the fixing vertical rod 22 and is in screw-thread fit with the fixed vertical rod 22. When the movable vertical rod 24 moves to a desired position relative to the fixed vertical rod 22, the screw is rotated to abut against the movable vertical rod 24, so that the movable vertical rod 24 can be fixed at the required position. The screw is rotated to be separated from the movable vertical rod 24, and the movable vertical rod 24 can move along the length direction of the fixed vertical rod 22 relative to the fixed vertical rod 22.

Figure 9:
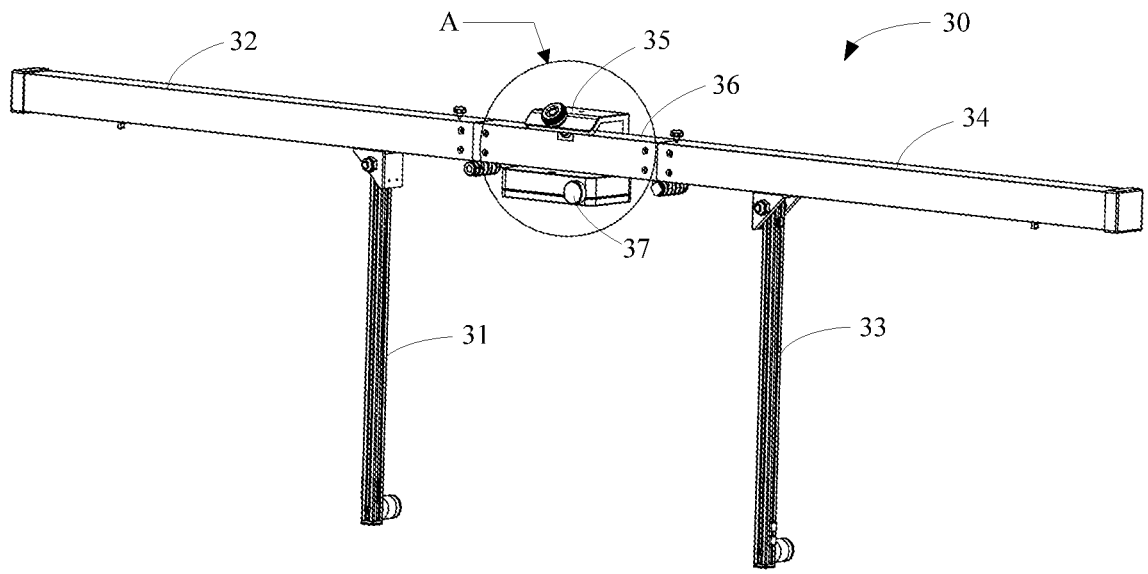
FIG. 9 is a three-dimensional view of a beam assembly of the calibration bracket shown in FIG. 1.
Figure 10:
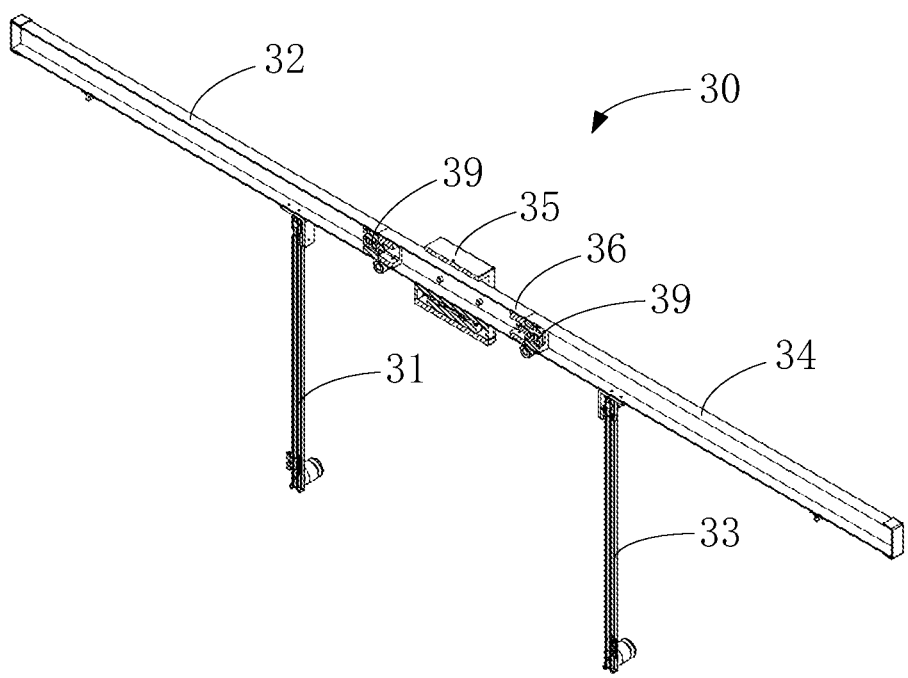
FIG. 10 is a cross-sectional view of the beam assembly shown in FIG. 9.
Figure 11:
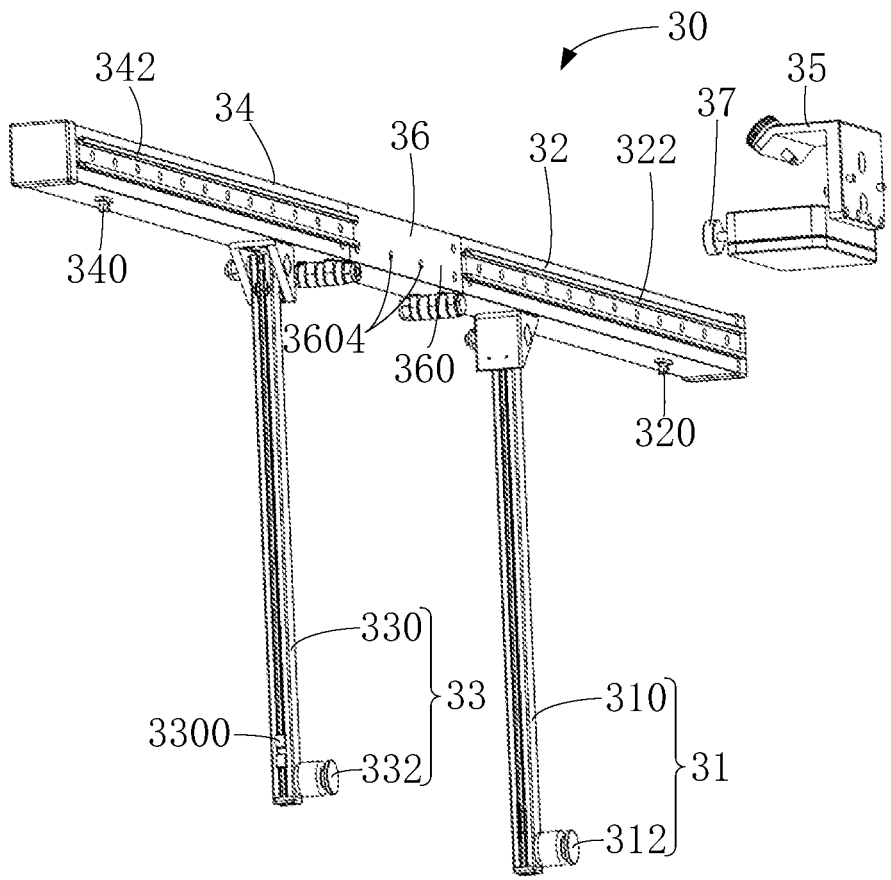
FIG. 11 is an exploded view of the beam assembly shown in FIG. 9.

Referring to FIG. 9, FIG. 10 and FIG. 11, the beam assembly 30 includes a first supporting rod 31, the first beam portion 32, a second supporting rod 33, the second beam portion 34, a mounting seat 35, the connecting portion 36, an adjustment mechanism 37 and a joint mechanism 39. The function of the first supporting rod 31 and the second supporting rod 33 is to lift the target to prevent falling, especially when the target area is relatively large and the weight is relatively large.

One end of the first supporting rod 31 can be pivotally connected to the first beam portion 32 through a hinge mechanism, and the like, and the first supporting rod 31 can rotate relative to the first beam portion 32 to be unfolded to be perpendicular to the first beam portion 32 and engaged with and parallel to the first beam portion 32.

The first supporting rod 31 includes a first supporting rod body 310 and a first supporting member 312. One end of the first supporting rod body 310 is hinged to the first beam portion 32, and the first supporting member 312 is mounted at the other end of the first supporting rod body 310. A side wall of the first supporting rod body 310 is provided with a first slot (not shown).

Similarly, one end of the second supporting rod 33 can be pivotally connected to the second beam portion 34 through a hinge mechanism, and the like, and the second supporting rod 33 can rotate relative to the second beam portion 34 to be unfolded to be perpendicular to the second beam portion 34 and engaged with and parallel to the second beam portion 34. The second supporting rod 33 includes a second supporting rod body 330 and a second supporting member 332. One end of the second supporting rod body 330 is hinged to the second beam portion 34, and the second supporting member 332 is mounted at the other end of the second supporting rod body 330. A side wall of the second supporting rod body 330 is provided with a second slot 3300. The first supporting member 312 and the second supporting member 332 extend in the same direction. When the first supporting rod 31 is unfolded to be perpendicular to the first beam portion 32, and the second supporting rod 33 is unfolded to be perpendicular to the second beam portion 34, the first slot and the second slot 3300 are arranged oppositely, and the first supporting member 312 and the second supporting member 332 can be used to jointly support a calibration element, such as a pattern plate.

The first beam portion 32 is provided with a first fixture block 320 and a first guide rail 322. The first fixture block 320 and the first supporting rod 31 are both connected to the same side of the first beam portion 32. When the first supporting rod 31 is rotated to be parallel to the first beam portion 32, the first fixture block 320 is engaged into the first slot, and the first supporting rod 31 is snapped into the first beam portion 32. The first guide rail 322 is disposed on the other side of the first beam portion 32 and parallel to the first beam portion 32. The first guide rail 322 is configured to mount a widget for mounting the calibration element, for example, mounting a calibration target, a reflector, a laser, and the like. The widget can slide along the first guide rail 322.

Similarly, the second beam portion 34 is provided with a second fixture block 340 and a second guide rail 342. The second fixture block 340 and the second supporting rod 33 are both connected to the same side of the second beam portion 34. When the second supporting rod 33 is rotated to be parallel to the second beam portion 34, the second fixture block 340 is engaged into the second slot 3300, and the second supporting rod 33 is snapped into the second beam portion 34. The second guide rail 342 is disposed on the other side of the second beam portion 34 and parallel to the second beam portion 34. The second guide rail 342 is configured to mount a widget for mounting the calibration element, for example, mounting a reflector, and the like. The widget can slide along the second guide rail 342. The first guide rail 322 and the second guide rail 342 are disposed symmetrically relative to the connecting portion 36, and the first beam portion 32 and the second beam portion 34 are also disposed symmetrically relative to the connecting portion 36. When the base 10 is placed on a horizontal plane, the first guide rail 322, the second guide rail 342, the first beam portion 32 and the second beam portion 34 are all horizontally disposed.

It may be understood that, in some other embodiments, the positions of the first fixture block 320 and the first slot can be interchanged, that is, the first fixture block 320 is mounted to the first supporting rod body 310, and the first slot is provided on the first beam portion 32. Similarly, the positions of the second fixture block 340 and the second slot 3300 can also be interchanged, that is, the second fixture block 340 is mounted to the second supporting rod body 330, and the second slot 3300 is provided on the second beam portion 34. Optionally, the first slot and the second slot 3300 are recessed in the corresponding beam portion.

It may be understood that, in some other embodiments, the first guide rail 322 and the second guide rail 342 may be disposed on other surfaces of the beam, such as the top surface. In some other embodiments, the first guide rail 322 and the second guide rail 342 do not need to be disposed, and the calibration element may be directly hung on the beam by using a hook or the like. The first guide rail 322 and the second guide rail 342 can also have other forms, which are not necessarily shown in the figure. For example, the guide rail can be one or more groove lines arranged on the top surface of the beam, and the outer wall of the beam can be used to form the groove line without mounting additional guide rails.

It may be understood that the number of supporting rods is not limited by the foregoing embodiment. For example, there may be only one supporting rod that is disposed at the approximate center of the connecting portion 36. In this case, the target located at the approximate center of the beam assembly 30 can also be lifted well. When the target used for calibration is located at other positions, the supporting rod can also be disposed at the corresponding position for lifting. There may be more than two supporting rods. In addition, the supporting rod can also be disposed on a rail, and the rail is disposed on a side surface or a bottom surface of the beam assembly 30, so that the supporting rod can move along the assembled beam assembly 30, so as to lift, at a suitable position, the targets that may be at different positions.

It may be understood that when the guide rail is used to make the supporting rod movable, the supporting rod can also be snapped onto the beam assembly 30 by using a fixture block and a slot.

The connecting portion 36 of the beam is sleeved in the mounting seat 35, and a first surface 360 of the connecting portion 36 is recessed with positioning holes 3604. There are preferably two positioning holes 3604, which are disposed along the length direction of the connecting portion 36.

Figure 12:
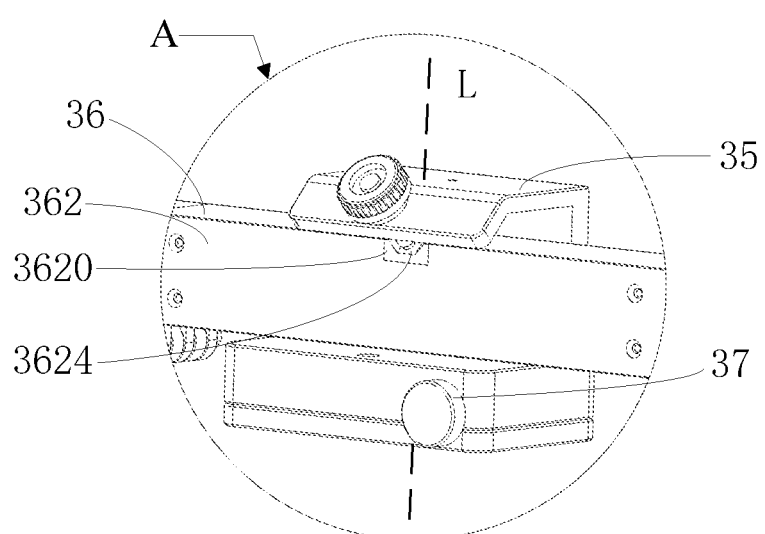
FIG. 12 is a partial enlarged diagram of a portion A in FIG. 9.
Figure 13:
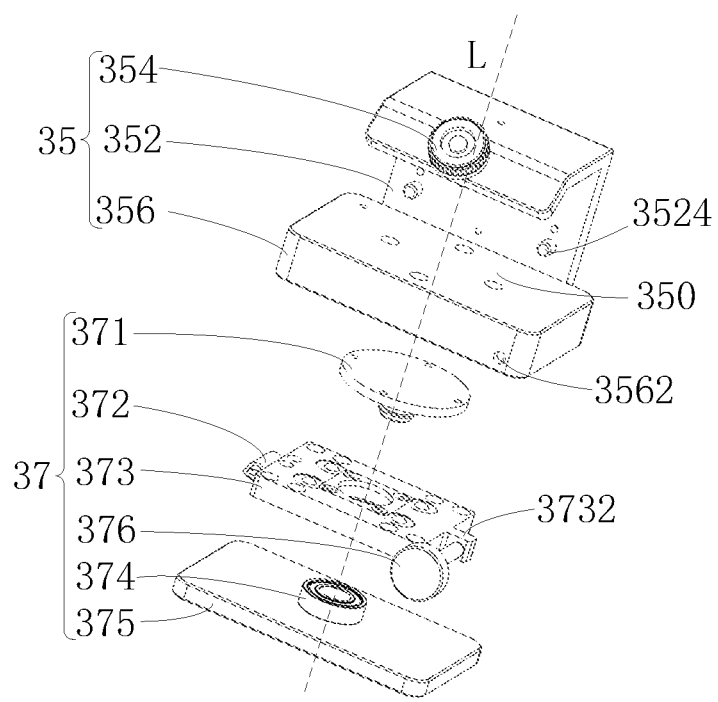
FIG. 13 is an exploded view of an adjustment mechanism of the beam assembly shown in FIG. 9.

Referring to FIG. 12, the connecting portion 36 is provided with a fixing groove 3620, a fixing surface 3624 is disposed in the fixing groove 3620, and the fixing groove 3620 is used in conjunction with the fixing rod 354 in FIG. 13 to fix the beam assembly onto the mounting seat 35. Optionally, the fixing groove 3620 is provided so that the fixing surface 3624 and the bottom surface of the mounting seat 35 are at a certain angle. The advantages of this arrangement are described in combination with the fixing rod in FIG. 13. For example, the fixing groove 3620 may be disposed between a second surface 362 and a top surface of the beam. The second surface 362 is arranged parallel to the first surface 360, and there is an included angle between the fixing surface 3624 and the first surface 360 and the second surface 362. For example, the fixing surface 3624 is disposed at 45 degrees with the first surface 360 and the second surface 362.

In the present embodiment, the first beam portion 32, the second beam portion 34 and the connecting portion 36 are all square tubes, which can reduce the weight of the calibration bracket 100 and make the connecting portion 36 easy to be firmly sleeved in the adjustment mechanism 38. It may be understood that, in some other embodiments, the first beam portion 32, the second beam portion 34 and the connecting portion 36 may also be tubes of other shapes, special-shaped materials, rods, or the like, which may be polygonal or circular tubes or rods, for example. When the beam is a tube of other shapes, the fixing groove 3620 may be disposed at a position at which a certain angle is formed between the fixing surface 3624 and the bottom surface of the mounting seat 35.

Figure 14:
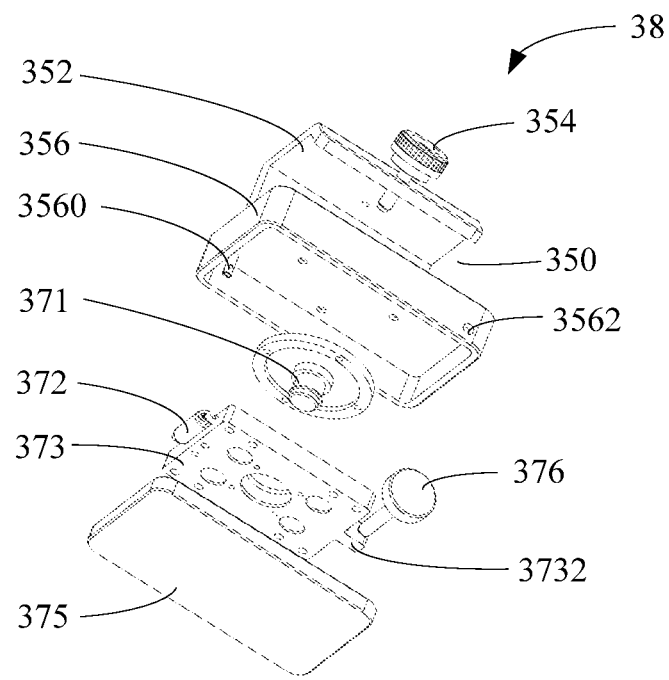
FIG. 14 is an exploded view of the adjustment mechanism shown in FIG. 13 from another perspective.

Referring to FIG. 13 and FIG. 14, the mounting seat 35 is sleeved in the connecting portion 36. The mounting base 35 includes a holder 352, a fixing rod 354 and a mounting housing 356.

Optionally, the mounting seat 35 may be disposed on the adjustment mechanism 37, so that the mounting seat 35 can rotate around the adjustment rotation axis L relative to the stand assembly 20 under the adjustment of the adjustment mechanism 37, to adjust the horizontal angle of the mounting base 35 and the beam assembly 30. Preferably, the adjustment mechanism 37 and the mounting seat are disposed up and down, so as to facilitate the removal and mounting of the beam from above while implementing adjustment of the horizontal angle. The adjustment rotation axis L is disposed parallel to the fixed vertical rod 22 and the movable vertical rod 24, that is, when the calibration bracket 100 is placed on a horizontal plane, the adjustment rotation axis L is disposed vertically. The mounting seat 35 is provided with a notch 350 for conveniently putting the connecting portion 36 into the mounting seat 35 or removing the connecting portion 36 from the mounting seat 35.

The holder 352 is generally hook-shaped to facilitate holding of the connecting portion 36. One end of the holder 352 is fixedly connected to the mounting housing 356, for example, mounted on the upper surface or side surface of the mounting housing 356, and the other end surrounds and grasps the connecting portion 36 of the beam assembly 20, leaving the notch 350. For example, the holder 352 may have the shape shown in FIG. 13, or may have other shapes, such as a circular hook shape, a hook shape of other polygons, a hook shape combined with a circular ring and a polygon, as long as the connecting portion 36 can be stably controlled. The "substantially hook-shaped" herein means that the holder 352 can extend by a certain length from a certain angle, thereby supporting and holding the connecting portion 36.

The holder 352 and the mounting housing 356 enclose a mounting channel for accommodating the connecting portion 36. The mounting channel is in communication with the notch 350. Two positioning columns 3524 are provided on the inner surface of the holder 352, which are located in the mounting channel for being inserted into the two positioning holes 3604 (see FIG. 8), to facilitate positioning of the connecting portion 36 in the mounting channel. The function of the positioning hole is to further reduce any displacement of the beam assembly 20 relative to the mounting seat 35 in the horizontal direction during calibration. The positioning column 3524 may also be disposed on the upper surface of the mounting housing 356 or on both the upper surface of the mounting housing 356 and the inner surface of the holder 352. The "positioning column" herein includes round, square, and elongated positioning columns, and the "positioning hole" includes round, square, and elongated positioning holes. When the positioning column and the positioning holes are generally point-shaped, there are preferably at least two positioning columns 3524 along the length direction of the connecting portion 36, to ensure that the connecting portion 36 does not move along the length direction. When the positioning column and the positioning hole are roughly elongated, only one pair of positioning column and one positioning hole can be used. It may be understood that, in some other embodiments, positions of the positioning hole 3604 and the positioning column 3524 can be interchanged, that is, the positioning hole 3604 is disposed on the holder 352 and in communication with the mounting channel, and the positioning column 3524 is disposed on the first surface 360 (see FIG. 8).

Optionally, the fixing rod 354 is disposed on the holder 352, which includes a knob and at least one section of screw rod and is mated with threads of the holder 352. When the connecting portion 36 is sleeved on the mounting seat 35, the central axis of the fixing rod 354 is perpendicular to the fixing surface 3624 at the beam connecting portion 36. By rotating the fixing rod 354, the fixing rod 354 can abut against the fixing surface 3624, and the connecting portion 36 of the beam assembly can be fixed to the mounting seat 35. Alternatively, by rotating the fixing rod 354, the fixing rod 354 can be separated from the fixing surface 3624, and the connecting portion 36 can be removed from the mounting seat 35 through the notch 350.

Optionally, the fixing surface 3624 and the bottom surface (that is, a horizontal plane) of the mounting base 35 are at a certain angle, and the fixing rod 354 and the bottom surface of the mounting base 35 are at a certain angle, the angle being greater than 0 degree and less than 90 degrees. Optionally, the angle is substantially 45 degrees. With this arrangement, only one fixing rod 354 can be used to apply, to the connecting portion 36, a pressing force toward the bottom surface and a side surface of the mounting seat. The side surface is a side opposite to a direction in which the fixing rod 354 extends, thereby fixing the connecting portion 36 with high stability by using a fixing seat, so that the beam assembly can be easily disassembled and assembled.

It may be understood that the mounting base 35 may have other structures, for example, a notch may not necessarily be maintained. After the connecting portion 36 is placed in the mounting base 35, a baffle or the like can be used to block the notch. The connecting portion 36 can also be mounted in other ways. For example, the mounting base 35 may be a complete ring structure without a notch for placing the beam. In this case, the beam may be assembled first, then the mounting base 35 can be inserted, and then the fixing rod 354 is used to tighten and fix the beam.

It may be understood that the bottom surface or side surface of the mounting seat 35 pressed by the connecting portion 36 may be arc-shaped or other irregular shapes. In this case, the fixing rod 354 may also be used to press the connecting portion 36 on these surfaces. There may be line contact between the fixing rod and these surfaces instead of surface contact, which will not affect the compression effect.

Optionally, when the mounting base 35 includes a notch 350, the surface of the mounting base 35 facing away from the notch 350 may also be used to mount a calibration element, for example, a multi-line laser 200 (see FIG. 1).

The mounting housing 356 is generally a cube with an opening on one side. The adjustment mechanism 37 is disposed in the opening of the mounting housing 356. The mounting housing 356 is provided with a threaded hole 3562. The adjustment mechanism 37 includes a supporting shaft 371, a first elastic member 372, a rotating member 373, a bearing seat 374, a base 375 and an adjusting rod 376. The adjustment mechanism 37 is configured to adjust the angle of the beam assembly 20 in the horizontal direction (that is, a yaw angle).

The supporting shaft 371 is accommodated in the mounting housing 356 and fixedly mounted to the inner wall of the mounting housing 356. A central axis of the supporting shaft 371 overlaps with the adjustment rotation axis L.

One end of the first elastic member 372 is fixed to the mounting column 3560, and the other end of the first elastic member 372 is fixed to the rotating member 373. In the present embodiment, the first elastic member 372 is a spring.

The rotating member 373 is substantially a cube, one end of which is provided with a protrusion 3732, and the protrusion 3732 and the first elastic member 372 are respectively located on two opposite sides of the rotating member 373. The rotating member 373 is sleeved on the bearing seat 374.

The bearing seat 374 is fixedly mounted to a surface of the base 375, and a central axis of the bearing seat 374 overlaps with the adjustment rotation axis L. The rotating member 373 is fixedly mounted to the base 375 and sleeved on the bearing seat 374. One end of the supporting shaft 371 is inserted into the bearing seat 374, so that the supporting shaft 371 and the mounting housing 356 can rotate together around the adjustment rotation axis L relative to the rotating member 373, the bearing seat 374 and the base 375.

The base 375 is mounted to the movable vertical rod 24, and the movable vertical rod 24 can drive the base 375 to rise or fall. In the present embodiment, the base 375 is a cube and covers the opening of the mounting housing 356. The supporting shaft 371, the first elastic member 372 and the rotating member 373 are all accommodated in a cavity formed by the mounting housing 356 and the base 375.

The "cube" in this specification includes a thin plate shape.

The adjusting rod 376 is mounted in the threaded hole 3562, and by rotating the adjusting rod 376, the adjusting rod 376 abuts against the protrusion 3732, and pushes the mounting seat 35 to rotate about the adjustment rotation axis L relative to the rotating member 373 and the base 375, thereby adjusting the horizontal angle of the mounting seat 35 and the connecting portion 36, so that the first elastic member 372 is stretched. The adjusting rod 376 is rotated in the opposite direction, and the mounting seat 35 can be pulled, by using the first elastic member 372, to rotate and reset around the adjustment rotation axis L relative to the rotating member 373 and the base 375.

It may be understood that, in some other embodiments, the base 375 may be omitted, and the rotating member 373 and the bearing seat 374 may be fixedly mounted to the top surface of the movable vertical rod 24 directly.

It may be understood that the foregoing adjustment mechanism 37 may be selectively used. When the adjustment mechanism 37 is removed, the mounting housing 356 of the mounting seat 35 can be removed, and the holder 352 is mounted onto the top surface of the movable vertical rod 24 or other additional mounting surfaces. It should be understood that the holder 352 may also extend to form a bottom surface and surround the lower surface of the connecting portion 36 of the beam assembly 30, that is, the holder 352 may have a bottom surface mounted onto the mounting housing 356.

Referring to FIG. 10 again, there are two joint mechanisms 39. One of the joint mechanisms 39 is connected between the first beam portion 32 and the connecting portion 36, and the other of the joint mechanisms 39 is connected between the second beam portion 34 and the connecting portion 36. In some embodiments, the joint mechanism 39 is fixed in the wall tubes of the first beam portion 32, the second beam portion 34 and the connecting portion 36. In some embodiments, the joint mechanism 39 is fixed outside the wall tubes of the first beam portion 32, the second beam portion 34 and the connecting portion 36, and is connected to cross-sections of the wall tubes of the first beam portion 32, the second beam portion 34 and the connecting portion 36 by snapping, screwing, bonding, and the like.

Figure 15:
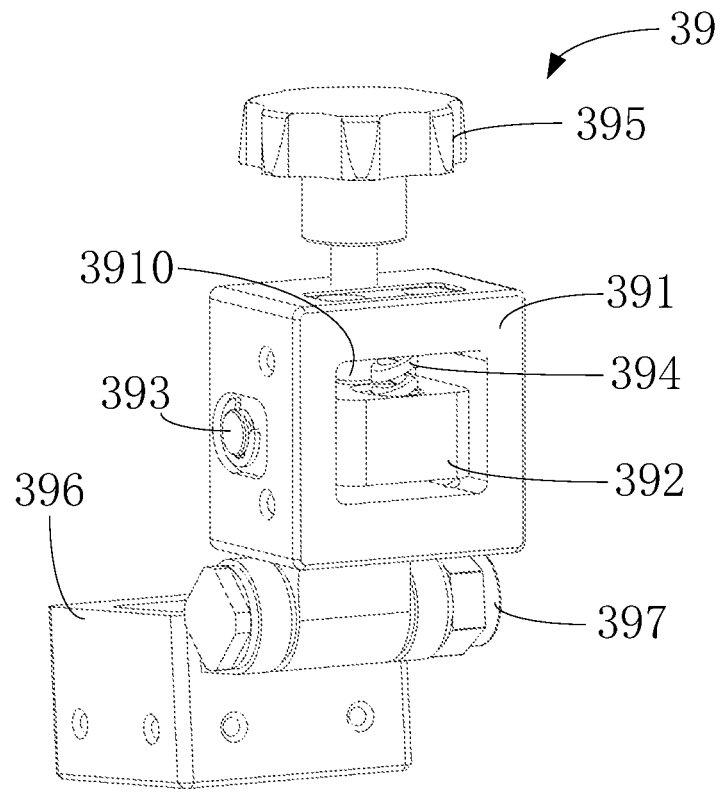
FIG. 15 is a three-dimensional view of a joint mechanism of the beam assembly shown in FIG. 9.
Figure 16:
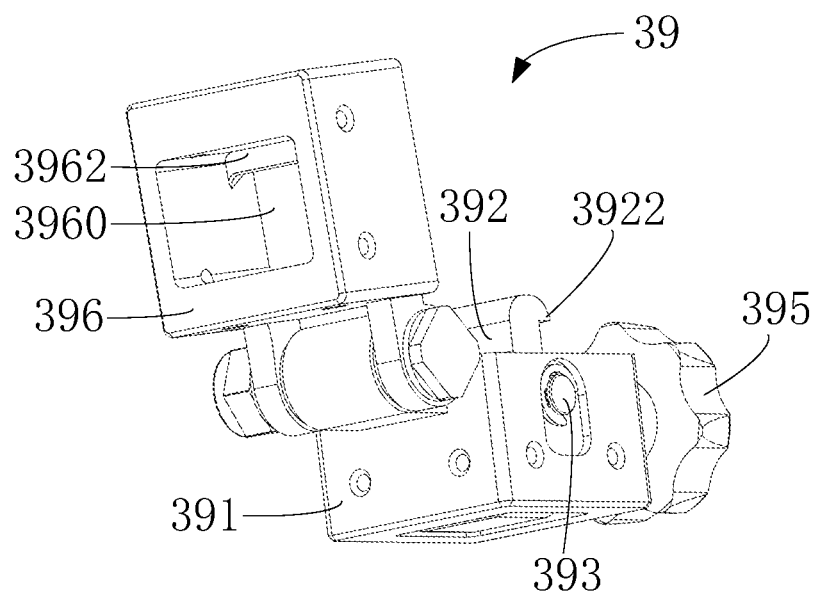
FIG. 16 is a three-dimensional view of the joint mechanism shown in FIG. 15 from another perspective.
Figure 17:
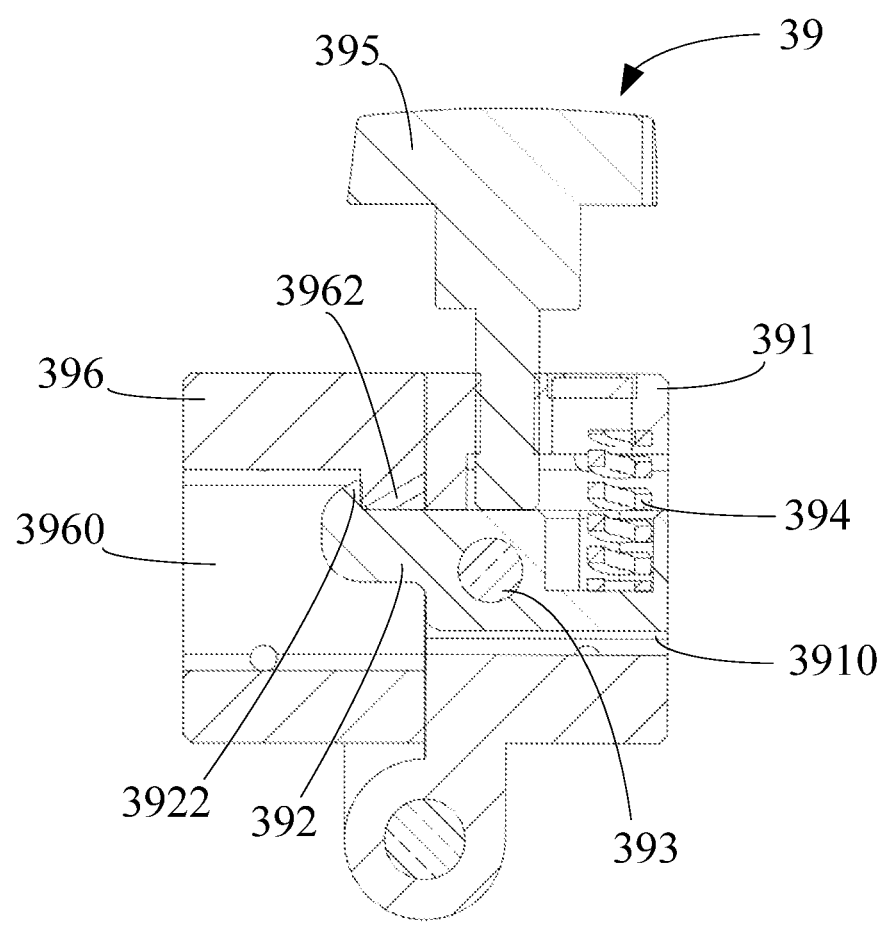
FIG. 17 is a cross-sectional view of the joint mechanism shown in FIG. 15.

Referring to FIG. 15, FIG. 16 and FIG. 17 together, a first embodiment of a structure of a joint mechanism 39 is shown. The joint mechanism 39 includes a first fixing member 391, a second fixing member 396, a first rotating shaft 397, a fastening member 392, a second rotating shaft 393, a second elastic member 394 and a screwing mechanism 395.

The first fixing member 391 and the second fixing member 396 are pivotally connected through the first rotating shaft 397. The first fixing member 391 is substantially a cube, one end of which is hinged to one end of the second fixing member 396. The first fixing member 391 is provided with a first through hole 3910.

The fastening member 392 is accommodated in the first through hole 3910, the second rotating shaft 393 passes through the middle of the fastening member 392, and two ends of the second rotating shaft 393 are respectively mounted to a side wall of the first fixing member 391. The fastening member 392 may rotate around the second rotating shaft 393, a hook portion 3922 extends from one end of the fastening member 392, one end of the second elastic member 394 abuts against the other end of the fastening member 392, and the other end of the second elastic member 394 abuts against the inner wall of the first fixing member 391. The second elastic member 394 is a compression spring for restoring elastic deformation to push the fastening member 392 to rotate around the second rotating shaft 393.

The screwing mechanism 395 includes a knob and at least one section of screw rod. One end of the screwing mechanism 395 passes through the first fixing member 391 from the outside of the first fixing member 391, and abuts against the fastening member 392. The screwing mechanism 395 and the second elastic member 394 are located on the same side of the central axis of the second rotating shaft 393, and the hook portion 3922 is located on the other side of the central axis of the second rotating shaft 393.

The second fixing member 396 is also substantially a cube and provided with a second through hole 3960. An inner wall of the second through hole 3960 is provided with a locking protrusion 3962. The first fixing member 391 is fixed to the inside of the connecting portion 36, and the second fixing member 396 is fixed to the inside of the first beam portion 32 or the second beam portion 34, so that the first beam portion 32 or the second beam portion 34 can be engaged with the connecting portion 36.

When the first fixing member 391 and the second fixing member 396 are fastened, the first fixing member 391 is in contact with the second fixing member 396, and the first through hole 3910 is in communication with the second through hole 3960. Pushed by the second elastic member 394, the hook portion 3922 is fastened to the locking protrusion 3962, and the screwing mechanism 395 is rotated, so that the screwing mechanism 395 presses the fastening member 392, and the hook portion 3922 is further fastened to the locking protrusion 3962, so that the first beam portion 32 or the second beam portion 34 is stably unfolded relative to the connecting portion 36.

The screwing mechanism 395 is rotated to be disengaged from the fastening member 392, so that the first fixing member 391 rotates relative to the second fixing member 396, and the hook portion 3922 is separated from the locking protrusion 3962. The first fixing member 391 is separated from the second fixing member 396, so that the first beam portion 32 or the second beam portion 34 can rotate relative to the connecting portion 36, and the beam assembly 30 is folded.

In the present embodiment, pushed by the second elastic member 394, the hook portion 3922 can be easily fastened to the locking protrusion 3962, so that the hook portion 3922 and the locking protrusion 3962 are fastened to each other in advance, and then the screwing mechanism 395 presses the fastening member 392, so that the hook portion 3922 is further fastened to the locking protrusion 3962.

It may be understood that, in some other embodiments, positions of the first fixing member 391 and the second fixing member 396 can be interchanged, that is, the first fixing member 391 is fixed to the inside of the first beam portion 32 or the second beam portion 34, and the second fixing member 396 is fixed to inside of the connecting portion 36.

It may be understood that the first fixing member 391 and the second fixing member 396 may also be integrally formed with inner walls of the first beam portion 32, the second beam portion 34 or the connecting portion 36, that is, the first fixing member 391 and the second fixing member 396 may be a part of the inner walls of the first beam portion 32, the second beam portion 34 or the connecting portion 36. The first fixing member 391 and the second fixing member 396 may not be connected by using a first rotating shaft or are not connected. However, the first beam portion 32 or the second beam portion 34 and the outer wall of the connecting portion 36 are connected by using an additional rotating shaft, which can also implement the pivotable connection between the first beam portion 32 or the second beam portion 34 and the connecting portion 36.

It may be understood that relative positions between the second elastic member 394 and the screwing mechanism 395 and the second rotating shaft 393 may be changed, that is, the second elastic member 394 may be closer to the second rotating shaft 393 than the screwing mechanism 395, as long as the fastening member 392 can be fastened to the locking protrusion 3962.

Figure 18:
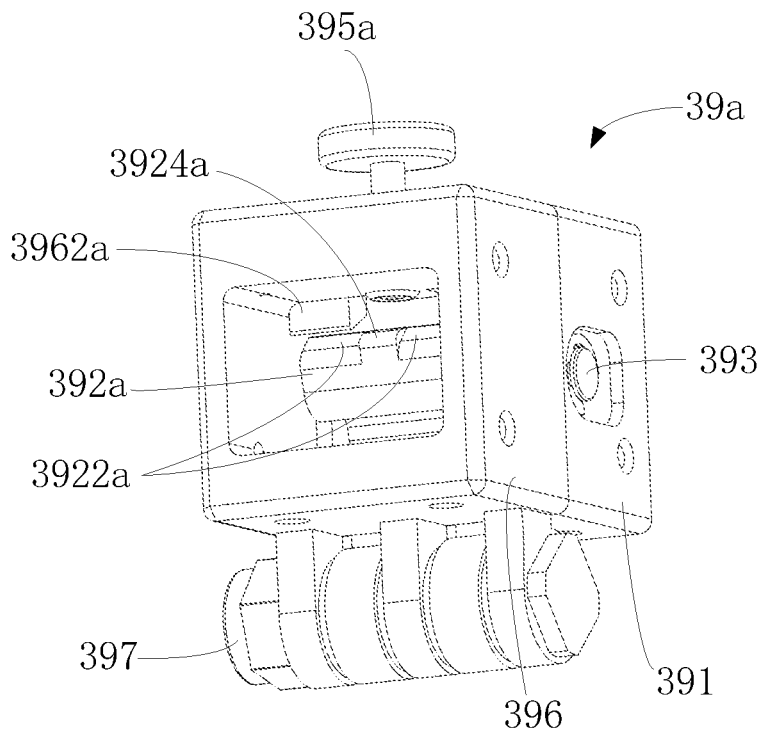
FIG. 18 is a three-dimensional view of a joint mechanism according to some embodiments.
Figure 19:
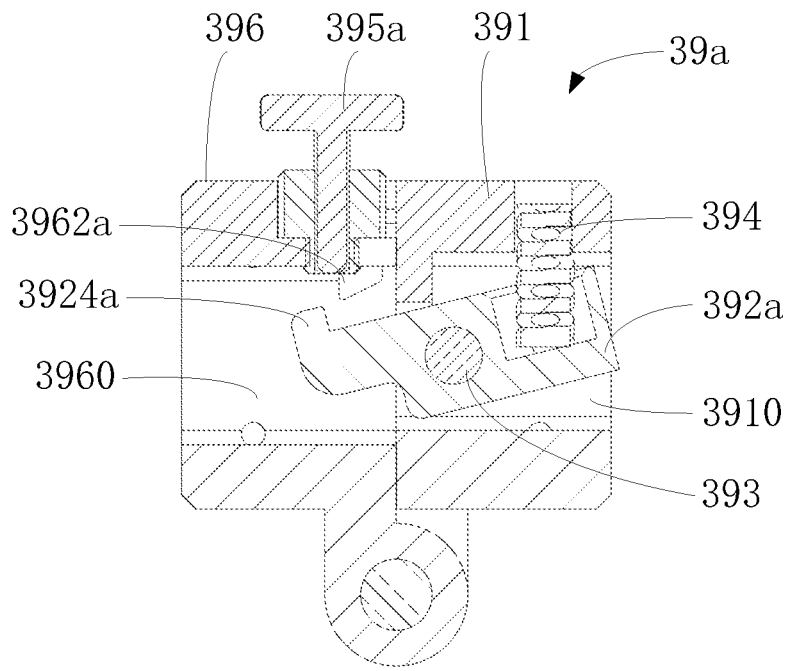
FIG. 19 is a cross-sectional view of the joint mechanism shown in FIG. 18.

Referring to FIG. 18 and FIG. 19 together, a second embodiment of a structure of a joint mechanism 39 is shown. The joint mechanism 39a provided by the second embodiment is basically the same as the joint mechanism 39 in the foregoing embodiment. A difference is that one end of the fastening member 392a is provided with a hook portion 3922a and a bump 3924a. Two hook portions 3922a are located on two opposite sides of the bump 3924a, and the inner wall of the second through hole 3960 is provided with a locking protrusion 3962a. There are two locking protrusions 3962a, and a position of each of the locking protrusions 3962a corresponds to a position of a corresponding one of the hook portions 3922a. The knob 395 is replaced with a button 395a, and the button 395a is mounted to the second fixing member 396. The second elastic member 394 is a compression spring compressed between the first fixing member 391 and the fastening member 392a.

When the first fixing member 391 and the second fixing member 396 are fastened, the first fixing member 391 is in contact with the second fixing member 396, and the first through hole 3910 is in communication with the second through hole 3960. The second elastic member 394 is pressed against the fastening member 392a, so that the two hook portions 3922a are respectively fastened to the two locking protrusions 3962a. The first fixing member 391 and the second fixing member 396 are mutually fastened to each other, so that the first beam portion 32 or the second beam portion 34 is unfolded relative to the connecting portion 36.

When the button 395a is pressed, and the button 395a pushes the bump 3924a to push the fastening member 392a to rotate around the second rotating shaft 393, the hook portion 3922a is separated from the locking protrusion 3962a, and the second elastic member 394 is further compressed. In this case, the first fixing member 391 can rotate relative to the second fixing member 396, so that the first fixing member 391 is separated from the second fixing member 396, and the first beam portion 32 or the second beam portion 34 can rotate relative to the connecting portion 36, to fold the beam assembly 30. The button 395a is loosened to make the button 395a far away from the fastening member 392a, and the second elastic member 394 recovers elastic deformation to push the fastening member 392a to rotate around the second rotating shaft 393, so that the hook portion 3922a is fastened to the locking protrusion 3962a.

Figure 20:
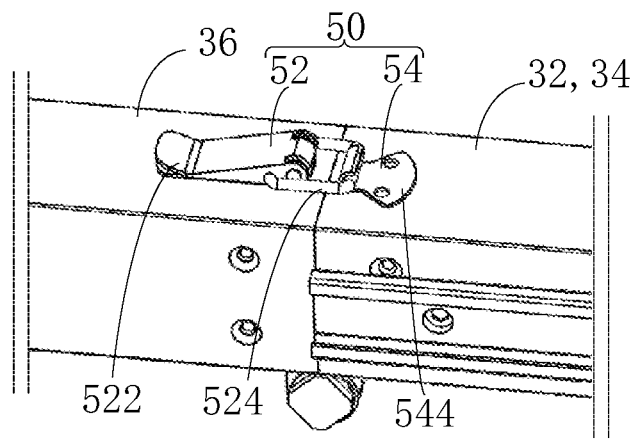
FIG. 20 is a three-dimensional view of a first fastener and a second fastener fastened to each other according to some embodiments.

Referring to FIG. 20, in order to increase the engagement strength of the first beam portion 32 and the second beam portion 34 with the connecting portion 36 respectively, so that the first beam portion 32 and the second beam portion 34 can be mounted with a calibration element with a more weight, the calibration bracket 100 may further include a fastening structure 50. One fastening structure 50 is connected between the first beam portion 32 and the connecting portion 36, and the other fastening structure 50 is connected between the second beam portion 34 and the connecting portion 36.

Each of the fastening structures 50 includes a first fastener 52 and a second fastener 54. The connecting portion 36 is provided with a first fastener 52, one end of the first fastener 52 is hinged to the connecting portion 36, and one end of the first fastener 52 hinged to the connecting portion 36 is provided with a pulling portion 522. The other end of the first fastener 52 is provided with a hook rod 524, and the first beam portion 32 or the second beam portion 34 is provided with a second fastener 54. The second fastener 54 is provided with a fastening portion 544. A hinge joint of the first beam portion 32 or the second beam portion 34 and the connecting portion 36 is located on one side of the connecting portion 36, and the first fastener 52 and the second fastener 54 are located on the other side of the connecting portion 36. When the first beam portion 32 and the second beam portion 34 are unfolded relative to the connecting portion 36, the first beam portion 32 and the second beam portion 34 are respectively in contact with the connecting portion 36, and the hook rod 524 is fastened to the fastening portion 544. By pulling the pulling portion 522, the hook rod 524 is separated from the fastening portion 544, and the first fastener 52 and the second fastener 54 may be separated, so that the first beam portion 32 or the second beam portion 34 can be folded relative to the connecting portion 36.

It may be understood that, in some other embodiments, positions of the first fastener 52 and the second fastener 54 can be interchanged, that is, the first fastener 52 is disposed on the first beam portion 32 or the second beam portion 34, and the second fastener 54 is disposed on the connecting portion 36. In some embodiments, the first fastener 52 and the second fastener 54 can be used in conjunction with the joint mechanism 39. That is, in this case, the joint mechanism 39 is disposed in inner walls of the first beam portion 32, the second beam portion 34 and the connecting portion 36. In some embodiments, the first fastener 52 and the second fastener 54 can be used alone. That is, in this case, the joint mechanism 39 is not disposed in inner walls of the first beam portion 32, the second beam portion 34 and the connecting portion 36.

Figure 21:
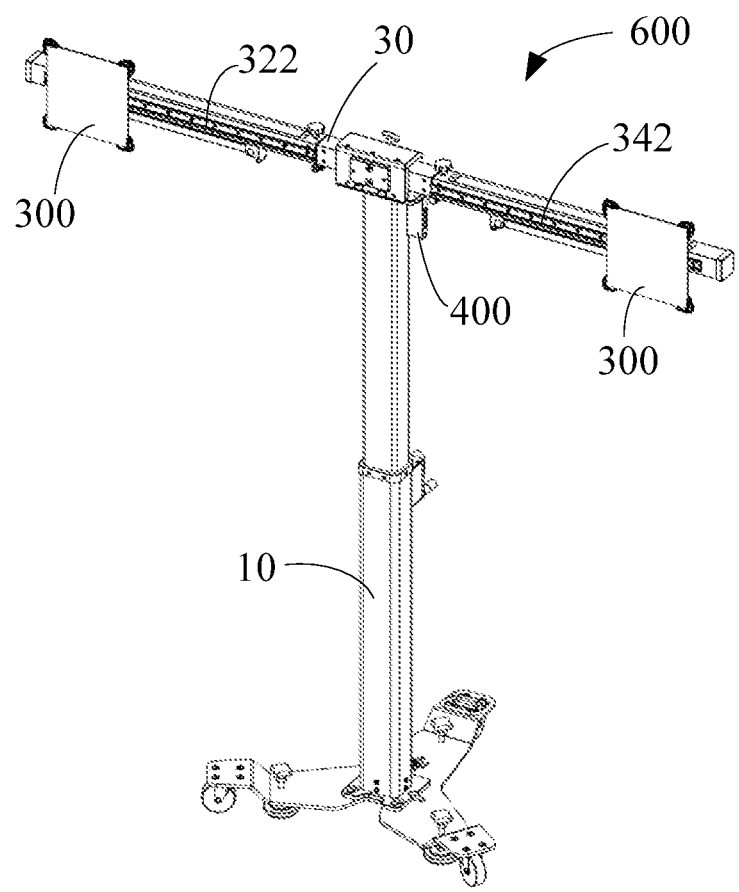
FIG. 21 is a three-dimensional view of a calibration system according to another embodiment, where the calibration system includes a calibration bracket and a calibration element, the calibration element being a reflector mounted to the calibration bracket.
Figure 22:
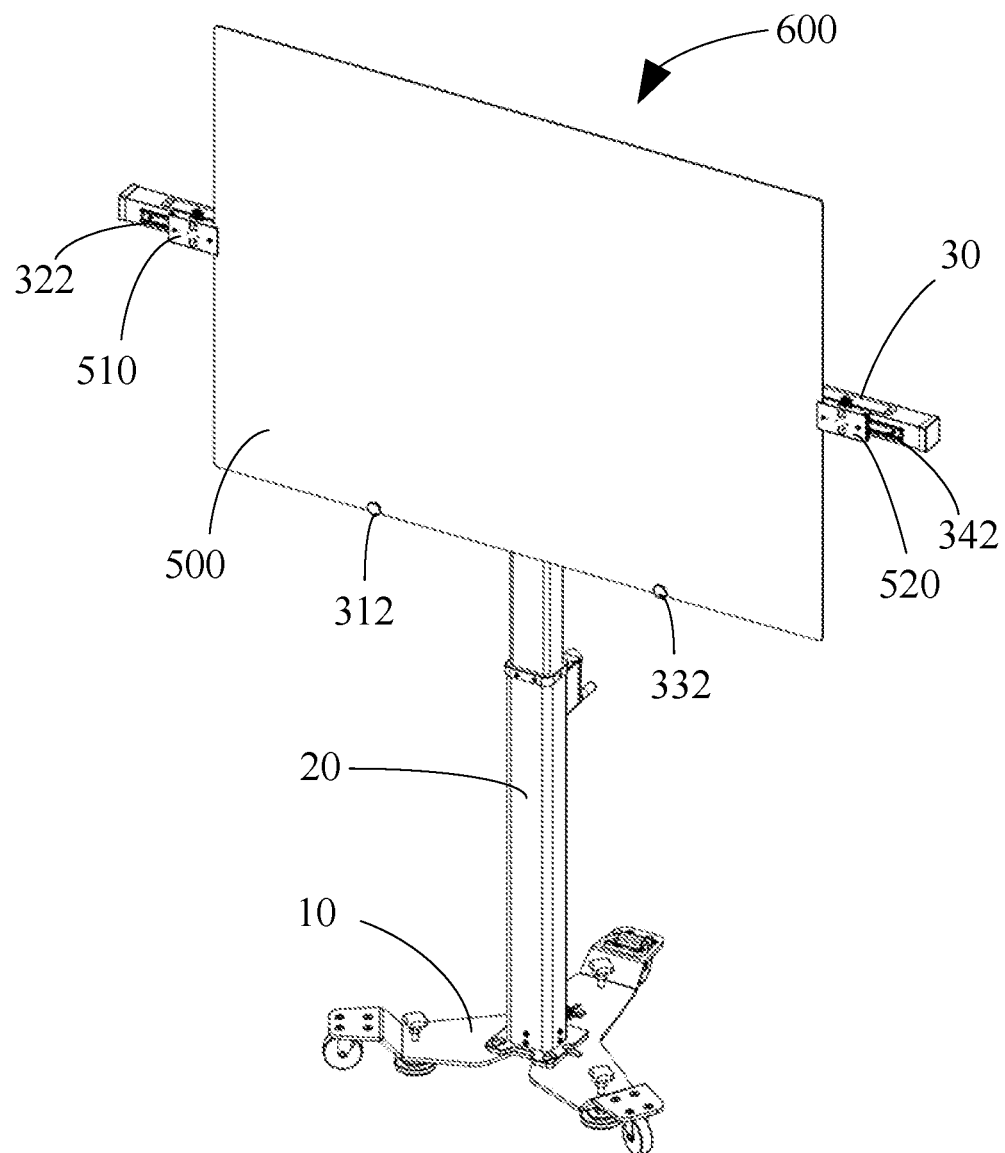
FIG. 22 is a three-dimensional view of a calibration system shown in FIG. 21, where the reflector is replaced with a pattern plate mounted to the calibration bracket.

Referring to FIG. 21 and FIG. 22 together, another embodiment of the present invention also provides a calibration system 600, including a calibration element and the calibration bracket 100 provided in the foregoing embodiments. The calibration element can be mounted to the calibration bracket 100. For example, the calibration element is a reflector 300 and a distance measurement device 400 (see FIG. 21). The reflector 300 may be mounted on a first guide rail 322 or a second guide rail 342 via a slider. The slider is mounted to the first guide rail 322 or the second guide rail 342, and can slide along the first guide rail 322 or the second guide rail 342 together with the reflector 300, and the distance measurement device 400 is fixedly mounted to the beam assembly 30. The reflector 300 may also be a target 300, and two targets are mounted on the first guide rail 322 and the second guide rail 342 through the slider. The reflector or target 300 may further be directly mounted on the beam assembly 30 by using a hook, or the like. In this case, the first guide rail 322 and the second guide rail 342 may be removed.

The foregoing distance measurement device 400 is used to measure the height of the beam assembly 30 from the ground, which is preferably displayed on a liquid crystal display screen of the distance measurement device 400. In one embodiment, the distance measurement device 400 is a laser rangefinder. A through hole 120 is disposed on the base 10 for making the laser of the laser rangefinder 400 strike the ground, to measure the height of the beam assembly 30 from the ground.

In another example, the calibration element is a pattern plate 500 (see FIG. 22), and the first supporting member 312 and the second supporting member 332 jointly lift the pattern plate 500 to prevent falling. In addition, a first fixing block 510 may be mounted on the first guide rail 322 and may slide along the first guide rail 322. A second fixing block 520 is mounted on the second guide rail 342 and may slide along the second guide rail 342. The first fixing block 510 and the second fixing block 520 are respectively located on two opposite sides of the pattern plate 500, and collaboratively clamp the pattern plate 500.

In an optional embodiment, the first fixing block 510 and the second fixing block 520 are sliders to which the reflector 300 is mounted. A slot is disposed on the opposite side of the slider to clamp the pattern plate 500, so that a fixing block can be formed. It may be understood that the first fixing block 510 and the second fixing block 520 may also be magnetic blocks, which can attract the pattern plate 500 from behind through magnetic adsorption, to enhance the firmness of the pattern plate 500 mounted on the beam assembly 30.

Finally, it should be noted that: The foregoing embodiments are merely intended for describing the technical solutions of the present invention, but not for limiting the present invention. Under the thinking of the present invention, combinations may also be made between the technical characteristics in the above embodiments or in different embodiments, the steps may be implemented in any order, and there are many other variations in different aspects of the invention as described above, which are not provided in detail for simplicity. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:
1. A calibration bracket, comprising:
a base;
a stand assembly fixedly connected to the base; and
a beam assembly comprising a first beam portion, a second beam portion and a connecting portion, the connecting portion being mounted to the stand assembly, one end of the connecting portion being pivotally connected to the first beam portion, and the other end of the connecting portion being pivotally connected to the second beam portion;

wherein, the beam assembly is used to mount a calibration element, the calibration element being used to calibrate a vehicle-mounted driver assistant system;

wherein, the connecting portion is non-pivotable around an axis, the axis being perpendicular to a length direction along the stand assembly and being perpendicular to a length direction along the connecting portion.

2. The calibration bracket according to claim 1, wherein the stand assembly comprises a fixed vertical rod and a movable vertical rod, one end of the fixed vertical rod being mounted to the base;

the movable vertical rod being arranged in the fixed vertical rod and being capable of moving only along a length direction of the fixed vertical rod relative to the fixed vertical rod; and the beam assembly being mounted to the movable vertical rod.

3. The calibration bracket according to claim 2, wherein cross-sections of the fixed vertical rod and the movable vertical rod are non-circular.

4. The calibration bracket according to claim 2, wherein one of the fixed vertical rod and the movable vertical rod comprises a guide rail, and the other is guided by the guide rail to move only along the length direction of the fixed vertical rod.

5. The calibration bracket according to claim 4, wherein the stand assembly comprises a driving mechanism mounted to the fixed vertical rod and configured to drive the movable vertical rod to move along a length direction of the fixed vertical rod relative to the fixed vertical rod.

6. The calibration bracket according to claim 1, wherein the beam assembly comprises a mounting seat, the connecting portion being arranged in the mounting seat and mounted to the stand assembly through the mounting seat; and the mounting seat being provided with a fixing rod, the fixing rod comprising at least one section of screw rod, so that the fixing rod can be screwed to press the connecting portion on the mounting seat.

7. The calibration bracket according to claim 6, wherein one of the mounting seat and the connecting portion comprises at least one positioning column, and the other comprises at least one positioning hole, the at least one positioning column being inserted into the at least one positioning hole to position the connecting portion in the mounting seat.

8. The calibration bracket according to claim 6, wherein the fixing rod is at an angle to a horizontal direction, so that the connecting portion can be pressed on a bottom surface and one side surface of the mounting seat, the angle being greater than 0 degree and less than 90 degrees.

9. The calibration bracket according to claim 8, wherein the angle is 45 degrees.

10. The calibration bracket according to claim 6, wherein the beam assembly comprises an adjustment mechanism connected to the mounting seat and configured to adjust a horizontal angle of the mounting seat and the connecting portion.

11. The calibration bracket according to claim 10, wherein the adjustment mechanism comprises a first elastic member, a rotating member and an adjusting rod, the rotating member being connected to the mounting seat, and the rotating member being capable of rotating around an adjustment rotation axis relative to the mounting seat, the adjustment rotation axis being arranged vertically;

one end of the first elastic member being fixed to the mounting seat, and the other end being fixed to the rotating member; and the adjusting rod being mounted to the mounting seat and being in screw-thread fit with the mounting seat;

the adjusting rod being rotated, so that the adjusting rod pushes the mounting seat to rotate around the adjustment rotation axis relative to the rotating member, and the horizontal angle of the mounting seat and the connecting portion can be adjusted; and the adjusting rod being rotated, so that the adjusting rod is away from the mounting seat, and the mounting seat can be pulled, by using the first elastic member, to rotate and reset around the adjustment rotation axis relative to the rotating member.

12. The calibration bracket according to claim 11, wherein the adjustment mechanism comprises a supporting shaft and a bearing seat, the supporting shaft being fixedly mounted to the mounting seat, and a central axis of the supporting shaft overlapping with the adjustment rotation axis;

the rotating member being sleeved on the bearing seat; and the supporting shaft being inserted into the bearing seat, and the supporting shaft and the mounting seat being capable of rotating together around the adjustment rotation axis relative to the rotating member and the bearing seat.

13. A calibration bracket, comprising:

a base;

a fixed vertical rod, one end of the fixed vertical rod being mounted to the base;

a movable vertical rod arranged in the fixed vertical rod and capable of moving only along a length direction of the fixed vertical rod relative to the fixed vertical rod; and a foldable beam assembly mounted to a top surface of the movable vertical rod;

wherein, the foldable beam assembly is used to mount a calibration element, the calibration element being used to calibrate a vehicle-mounted driver assistant system;

wherein, the foldable beam assembly is non-pivotable around an axis, the axis being perpendicular to a length direction along the fixed vertical rod and being perpendicular to a length direction along the foldable beam assembly when the foldable beam assembly being unfolded.

14. The calibration bracket according to claim 13, wherein the beam assembly comprises a beam, an adjustment mechanism and a mounting seat, the beam being disposed in the mounting seat, the mounting seat being disposed on the adjustment mechanism, and the adjustment mechanism being configured to adjust a horizontal angle of the beam.

15. A calibration bracket, comprising:

a base;

a stand assembly fixedly connected to the base; and a foldable beam assembly mounted to the stand assembly and comprising a beam, the beam comprising at least two parts, the at least two parts being connected through a joint mechanism, so that the at least two parts can be pivotally connected;

wherein, the joint mechanism comprises a first fixing member and a second fixing member, the first fixing member and the second fixing member being fastened, and one of the first fixing member and the second fixing member being rotatable relative to the other of the first fixing member and the second fixing member;

wherein one of the first fixing member and the second fixing member is fixed to one part of the at least two parts, and wherein the other of the first fixing member and the second fixing member being fixed to another part of the at least two parts;

wherein, the foldable beam assembly is used to mount a calibration element, the calibration element being used to calibrate a vehicle-mounted driver assistant system.

16. The calibration bracket according to claim 15, the first fixing member comprising a fastening member, a rotating shaft and a second elastic member, the rotating shaft being fixedly connected to an inner wall of the first fixing member, the fastening member being mounted to the rotating shaft, being capable of rotating around the rotating shaft, and comprising a first end and a second end, the first end and the second end being respectively located at two ends of the rotating shaft, and the second elastic member being connected to the inner wall of the first fixing member and the first end of the fastening member; and the second fixing member comprising a locking protrusion, the locking protrusion being mated with the second end of the fastening member and being engaged with the fastening member under the action of the second elastic member.

17. The calibration bracket according to claim 16, wherein the joint mechanism further comprises a screwing mechanism, the screwing mechanism passing through the first fixing member and being screwed to abut against the first end of the fastening member, so that the first end can be fastened to the locking protrusion.

18. A calibration bracket, comprising:
a base;
a stand assembly fixedly connected to the base;
a foldable beam; and
a mounting seat, the foldable beam being disposed in the mounting seat, the mounting seat being provided with a fixing rod, the fixing rod being configured to press the beam on the mounting seat and being at an angle to a horizontal plane, the angle being greater than 0 degree and less than 90 degrees, the horizontal plane being parallel to a ground where the base stands on;
wherein, the foldable beam assembly is used to mount a calibration element, the calibration element being used to calibrate a vehicle-mounted driver assistant system.

19. The calibration bracket according to claim 18, wherein the angle is 45 degrees.

20. The calibration bracket according to claim 18, wherein the fixing rod comprises at least one section of screw rod, so that the fixing rod can be screwed to press the beam on the mounting seat.

\* \* \* \* \*